(12) United States Patent
Jo et al.

(10) Patent No.: US 11,467,793 B2
(45) Date of Patent: Oct. 11, 2022

(54) OUTPUT DEVICE FOR CONTROLLING OPERATION OF DOUBLE-SIDED DISPLAY

(71) Applicant: LG ELECTRONICS INC., Seoul (KR)

(72) Inventors: Youngkyu Jo, Seoul (KR); Wonsik Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/085,961

(22) PCT Filed: Apr. 15, 2016

(86) PCT No.: PCT/KR2016/003942
§ 371 (c)(1),
(2) Date: Sep. 17, 2018

(87) PCT Pub. No.: WO2017/159916
PCT Pub. Date: Sep. 21, 2017

(65) Prior Publication Data
US 2019/0102129 A1    Apr. 4, 2019

(30) Foreign Application Priority Data

Mar. 18, 2016 (KR) .......................... 10-2016-0032881

(51) Int. Cl.
*G06F 3/14*    (2006.01)
*G09F 7/00*    (2006.01)
(Continued)

(52) U.S. Cl.
CPC .............. *G06F 3/14* (2013.01); *G06F 3/1446* (2013.01); *G09F 7/00* (2013.01); *G09G 3/2092* (2013.01);
(Continued)

(58) Field of Classification Search
CPC ....... G06F 3/1423–1438; G06F 3/1446; G06F 3/1454; G06F 1/1647; G06F 1/1641;
(Continued)

(56) References Cited

U.S. PATENT DOCUMENTS

2002/0008675 A1* 1/2002 Mayer, III ............ G06F 3/1446
345/4
2008/0125181 A1* 5/2008 Yoon ..................... G06F 1/1622
455/566
(Continued)

FOREIGN PATENT DOCUMENTS

JP    2006011387    1/2006
JP    2014215331    11/2014
(Continued)

OTHER PUBLICATIONS

PCT International Application No. PCT/KR2016/003942, International Search Report dated Dec. 12, 2016, 4 pages.

*Primary Examiner* — Towfiq Elahi
(74) *Attorney, Agent, or Firm* — Lee, Hong, Degerman, Kang & Waimey PC

(57) ABSTRACT

An output device for controlling an operation of a double-sided display panel, according to an embodiment of the present invention, comprises: a master controller for controlling an operation of a front display panel; a slave controller for controlling an operation of a back display panel; a first MUX which is controlled by the master controller and receives a first image inputted to the master controller and a second image inputted to the slave controller; and a second MUX which is controlled by the slave controller and receives the first image and the second image, wherein the master controller may control the first MUX and the second MUX to output either of the first image or the second image to each of the front display panel and the back
(Continued)

display panel, on the basis of an image output control command.

13 Claims, 24 Drawing Sheets

(51) Int. Cl.
*G09G 3/20* (2006.01)
*G09G 5/00* (2006.01)

(52) U.S. Cl.
CPC ......... *G09G 5/003* (2013.01); *G09G 2300/02* (2013.01); *G09G 2310/0297* (2013.01); *G09G 2360/04* (2013.01); *G09G 2370/16* (2013.01); *G09G 2370/20* (2013.01); *G09G 2380/06* (2013.01)

(58) Field of Classification Search
CPC .... G02F 2001/033342; H01L 27/3267; H04N 5/4403; H04N 7/17309; H04N 21/43; H04N 21/45; H04N 21/60; H04N 21/422; G09G 2300/023; G09G 2300/026; G09G 2360/04; G09G 2360/06
See application file for complete search history.

(56) References Cited

U.S. PATENT DOCUMENTS

| | | | | |
|---|---|---|---|---|
| 2009/0079746 | A1* | 3/2009 | Howard | G06F 1/3218 345/502 |
| 2009/0135311 | A1* | 5/2009 | Kurita | H04N 21/43637 348/739 |
| 2014/0092107 | A1* | 4/2014 | Ferry | G06T 1/20 345/520 |
| 2014/0184471 | A1* | 7/2014 | Martynov | G06F 1/1637 345/1.2 |
| 2014/0222234 | A1* | 8/2014 | Hirayama | G06F 1/3234 700/295 |
| 2015/0324164 | A1* | 11/2015 | Kim | G06F 3/1446 345/1.3 |
| 2015/0363154 | A1* | 12/2015 | Frederick | G06F 3/1423 345/1.3 |
| 2018/0203660 | A1* | 7/2018 | Hwang | G06F 3/1446 |

FOREIGN PATENT DOCUMENTS

| | | |
|---|---|---|
| KR | 1020040009101 | 1/2004 |
| KR | 1020080004718 | 1/2008 |
| KR | 1020130036677 | 4/2013 |

* cited by examiner

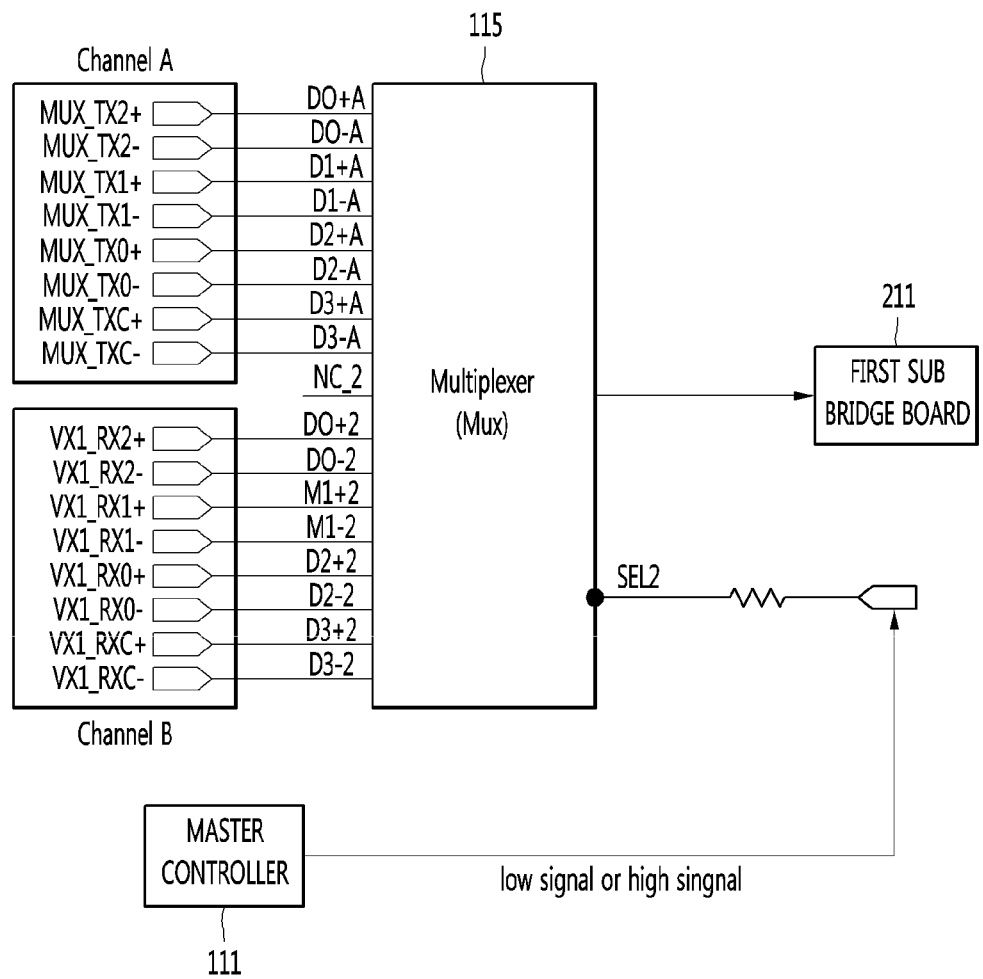

FIG. 8

| TYPE OF IMAGE OUTPUT CONTROL COMMAND | MUX Control(GPIO) | | OPERATION OF MUX |
|---|---|---|---|
| | Master | Slave | |
| 1:1 OUTPUT | Low | Low | FIRST IMAGE INPUT TO MASTER CONTROLLER IS OUTPUT ON FRONT DISPLAY PANEL AND SECOND IMAGE INPUT TO SLAVE CONTROLLER IS OUTPUT ON BACK DISPLAY PANEL |
| SWAP OUTPUT | High | High | FIRST IMAGE INPUT TO MASTER CONTROLLER IS OUTPUT ON BACK DISPLAY PANEL AND SECOND IMAGE INPUT TO SLAVE CONTROLLER IS OUTPUT ON FRONT DISPLAY PANEL |
| MASTER DUPLICATION | Low | High | FIRST IMAGE INPUT TO MASTER CONTROLLER IS DUPLICATED TO AND OUTPUT ON BACK DISPLAY PANEL |
| SLAVE DUPLICATION | High | Low | SECOND IMAGE INPUT TO SLAVE CONTROLLER IS DUPLICATED TO AND OUTPUT ON FRONT DISPLAY PANEL |

FIG. 14
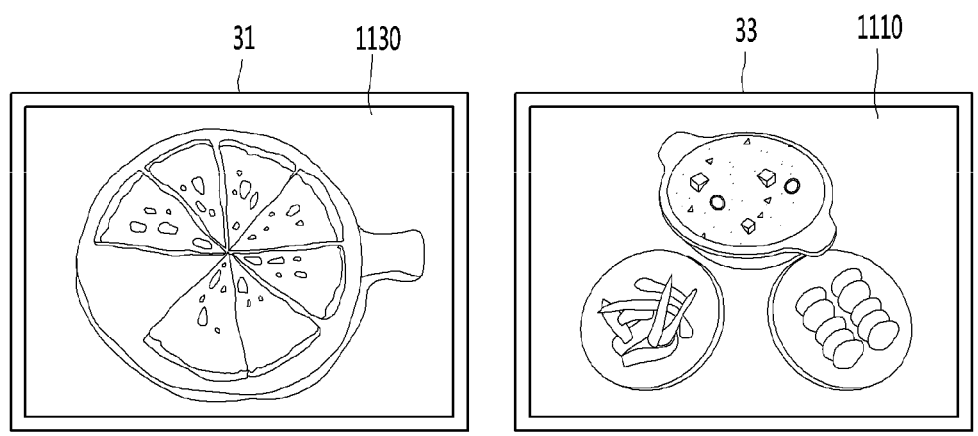
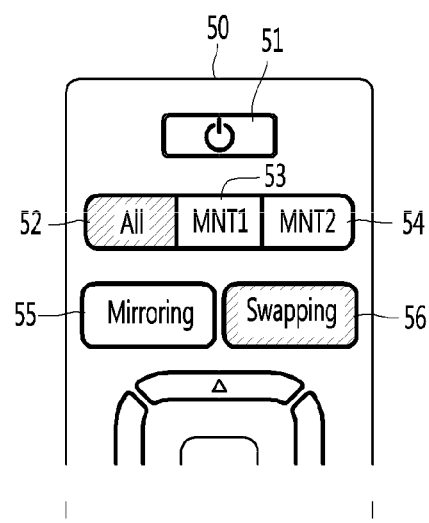

FIG. 17
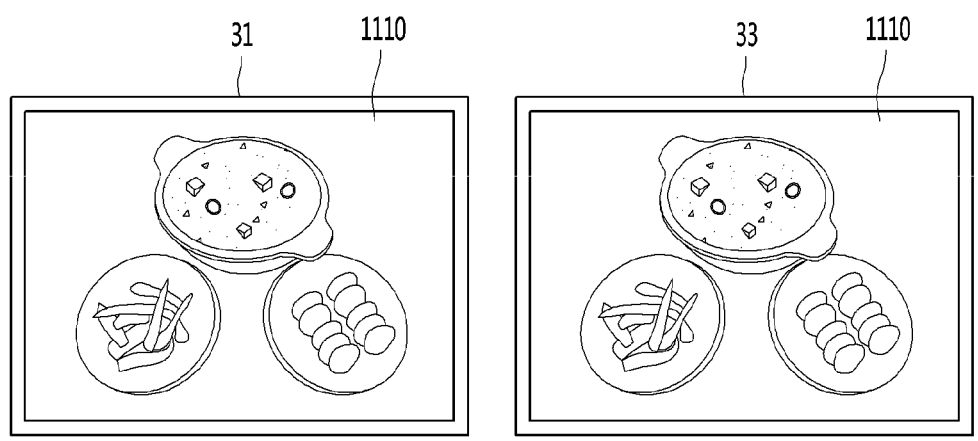
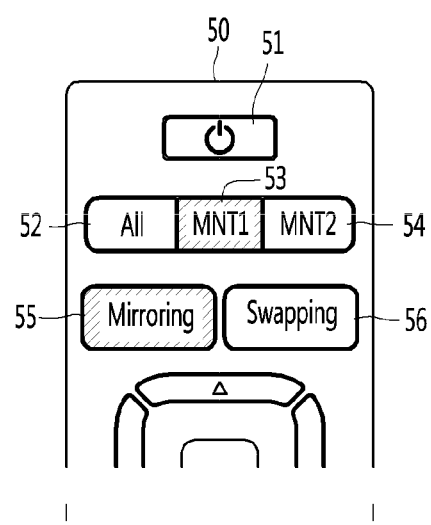

FIG. 18
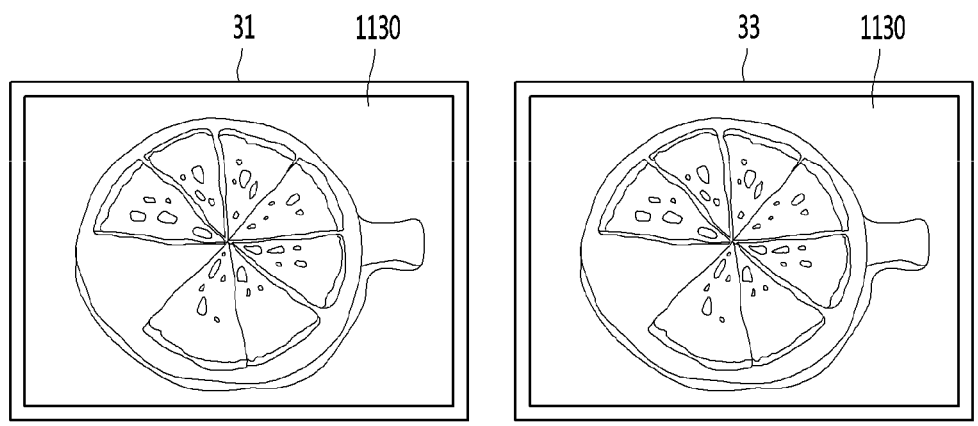
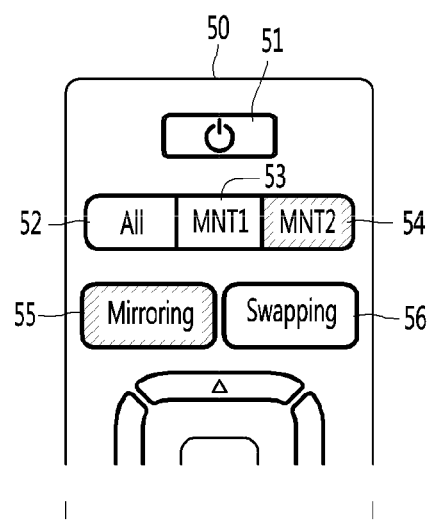

FIG. 24
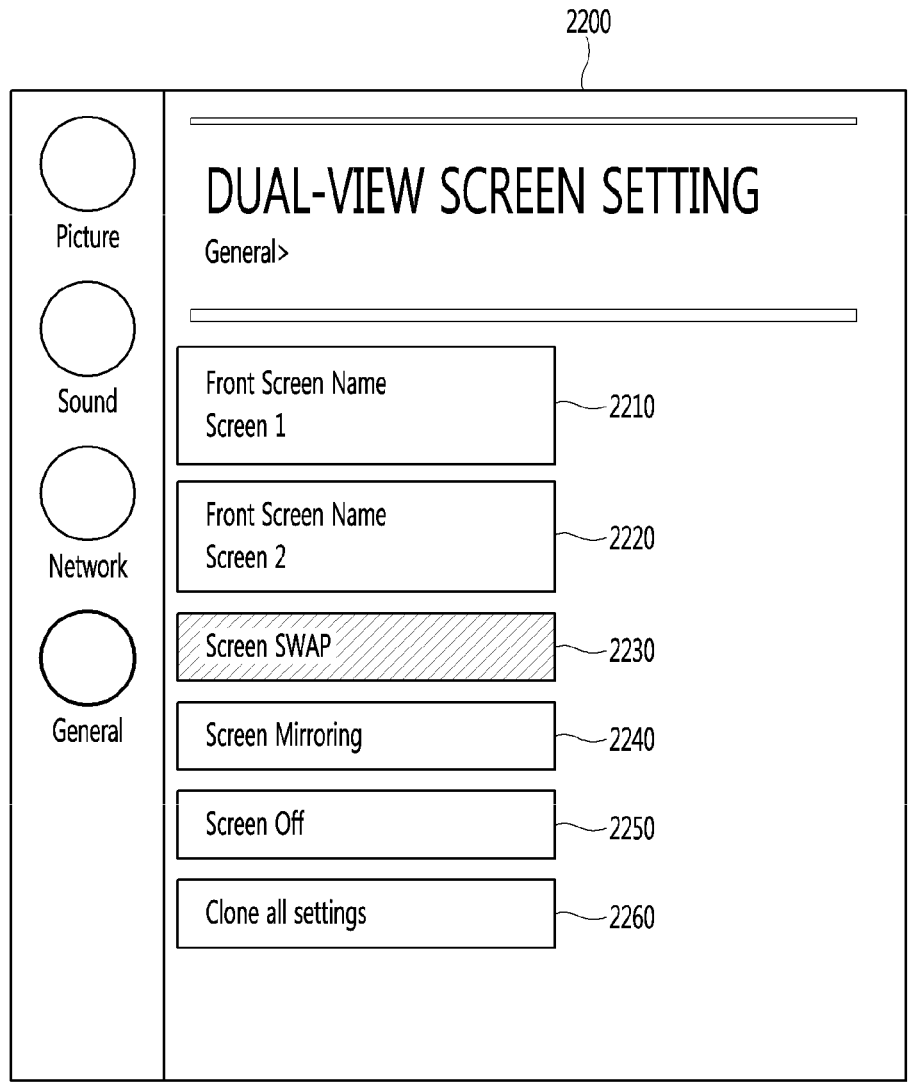
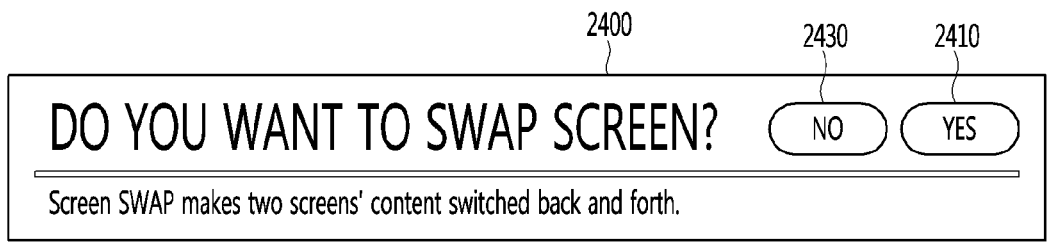

FIG. 26
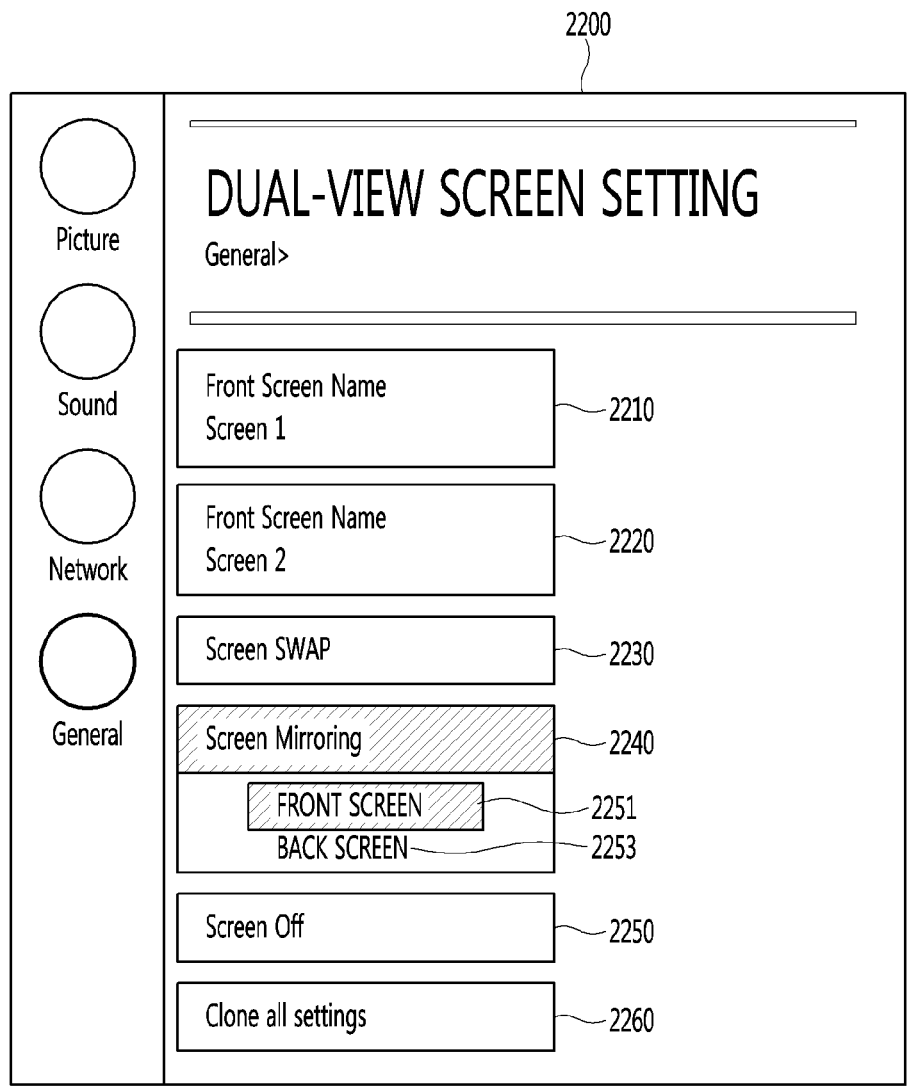
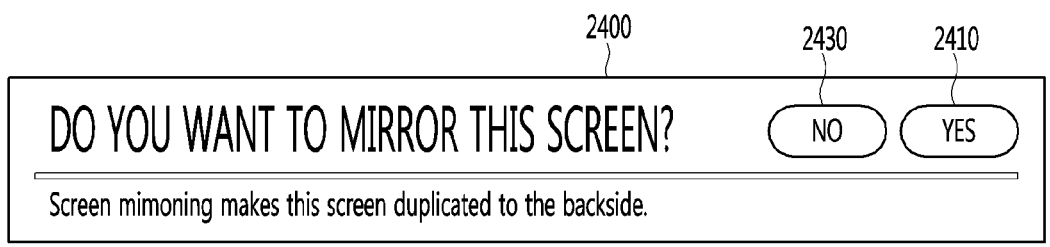

You cannot run Mirroring while playing the encrypted content.

Exit duplication mode.

OUTPUT DEVICE FOR CONTROLLING OPERATION OF DOUBLE-SIDED DISPLAY

CROSS-REFERENCE TO RELATED APPLICATIONS

This application is the National Stage filing under 35 U.S.C. 371 of International Application No. PCT/KR2016/003942, filed on Apr. 15, 2016, which claims the benefit of earlier filing date and right of priority to Korean Application No. 10-2016-0032881, filed on Mar. 18, 2016, the contents of which are all hereby incorporated by reference herein in their entirety.

TECHNICAL FIELD

The present invention relates to an output device and, more particularly, to an output device for controlling operation of a double-sided display.

BACKGROUND ART

A digital signage is a system for displaying predetermined information on a plurality of display devices by centralized management. Each of the display devices configuring the digital signage is fixedly provided at a predetermined place and is used by visitors who visit the place. By active participation of the visitors, desired information may be further provided. In particular, the digital signage is a communication tool capable of realizing business marketing, advertising, training effects and customer experience, which provides not only broadcast programs but also specific information as digital images at public places such as airports, hotels, hospitals or subway stations and supplies software or management platform capable of controlling main functions to an existing commercial digital information display.

However, a conventional digital signage outputs information on only one side thereof and thus a user can watch an image only in one direction. Therefore, the user has to move to a direction, in which the information is output, in order to confirm the information.

In addition, the conventional digital signage outputs the information on only one side thereof and thus cannot provide a large amount of information.

DISCLOSURE

Technical Problem

An object of the present invention is to provide an output device capable of more efficiently providing a large amount of information to a user by controlling operation of a double-sided display for outputting information on both sides thereof.

Another object of the present invention is to provide an output device capable of easily manipulating information on a double-sided display through a remote control device.

Technical Solution

The object of the present invention can be achieved by providing an output device for controlling operation of a double-sided display panel including a master controller configured to control operation of a front display panel, a slave controller configured to control operation of a back display panel, a first multiplexer controlled by the master controller and configured to receive a first image input to the master controller and a second image input to the slave controller, and a second multiplexer controlled by the slave controller and configured to receive the first image and the second image, wherein the master controller controls the first multiplexer and the second multiplexer such that any one of the first image and the second image is output on each of the front display panel and the back display panel based on an image output control command.

The master controller may transmit, to the first multiplexer, a low signal for enabling the first multiplexer to output the first image or a high signal for enabling the first multiplexer to output the second image, based on the image output control command, and the slave controller may transmit, to the second multiplexer, a low signal for enabling the second multiplexer to output the second image or a high signal for enabling the second multiplexer to outputting the first image.

If the image output control command is an individual image output control command, the master controller may transmit, to the first multiplexer, the low signal for enabling the first multiplexer to output the first image, and the slave controller may transmit, to the second multiplexer, the low signal for enabling the second multiplexer to output the second image.

If the image output control command is a swap image output control command, the master controller may transmit, to the first multiplexer, the high signal for enabling the first multiplexer to output the second image, and the slave controller may transmit, to the second multiplexer, the high signal for enabling the second multiplexer to output the first image.

If the image output control command is a master duplication image output control command, the master controller may transmit, to the first multiplexer, the low signal for enabling the first multiplexer to output the first image, and the slave controller may transmit, to the second multiplexer, the high signal for enabling the second multiplexer to output the first image.

If the image output control command is a slave duplication image output control command, the master controller may transmit, to the first multiplexer, the high signal for enabling the first multiplexer to output the second image, and the slave controller may transmit, to the second multiplexer, the low signal for enabling the second multiplexer to output the second image.

Each of the first multiplexer and the second multiplexer may include an image selection pin for outputting only any one of the first image and the second image, and the low signal or the high signal may be input to the image selection pin.

Each of the first multiplexer and the second multiplexer may further include a plurality of pins for receiving the first image and a plurality of pins for receiving the second image, and any one of the first image and the second image may be output based on a signal input to the image selection pin.

The output device may further include a first distributer configured to distribute the first image to the first multiplexer and the second multiplexer and a second distributor configured to distribute the second image to the first multiplexer and the second multiplexer.

The output device may further include a bridge output device including a first bridge board configured to output any one of the first image and the second image to the front display panel and a second bridge board configured to output any one of the first image and the second image to the back display panel.

The bridge output device may further include an infrared (IR) reception unit configured to receive a request for controlling operation of the front display panel and the back display panel from a remote control device.

The IR reception unit may transmit the received request to the master controller, and the master controller may acquire the image output control command based on the request.

If the IR reception unit receives a request for controlling a power state of the double-sided display panel, the master controller may control the power state of the double-sided display panel according to a power control command based on the request.

Each of the first multiplexer and the second multiplexer may include a high definition multimedia interface (HDMI) port for outputting any one of the first image and the second image.

The master controller may deliver the image output control command to the slave controller, and the slave controller may control the second multiplexer such that any one of the first image and the second image is output on the back display panel based on the image output control command.

Advantageous Effects

According to various embodiments of the present invention, it is possible to more efficiently provide a large amount of information to a user by controlling operation of a double-sided display for outputting information on both sides thereof.

In addition, the user can easily manipulate information on a double-sided display through a remote control device, thereby actively utilizing information.

DESCRIPTION OF DRAWINGS

FIG. 5 is a diagram illustrating the detailed configuration of a MUX according to an embodiment of the present invention.

FIG. 6 is a table showing which image is output according to a control signal input to an image selection pin provided in the MUX according to an embodiment of the present invention.

FIG. 8 is a diagram illustrating a process of controlling a MUX according to the type of an image output control command according to an embodiment of the present invention.

FIGS. 12 to 14 are diagrams illustrating a process of controlling operation of a double-sided display device based on a swap image output control command according to an embodiment of the present invention.

FIGS. 15 to 18 are diagrams illustrating a process of controlling operation of a double-sided display device based on a duplication image output control command according to an embodiment of the present invention.

FIGS. 24 and 25 are diagrams a process of controlling a double-sided display panel through a screen swap item according to an embodiment of the present invention.

FIGS. 26 to 30 are diagrams a process of controlling a double-sided display panel through a mirroring item according to an embodiment of the present invention.

BEST MODE

Description will now be given in detail according to exemplary embodiments disclosed herein, with reference to the accompanying drawings. Use of such a suffix such as "module" and "unit" of elements used in the following description is merely intended to facilitate description of the specification, and the suffix itself is not intended to give any special meaning or function.

A double-sided display device according to an embodiment of the present invention is an intelligent display device obtained by adding a computer support function to a broadcast reception function, and may include an interface capable of being more easily used, such as a handwriting type input device, a touchscreen or a pointing device, by adding an Internet function while being faithful to the broadcast reception function. With support of a wired or wireless Internet function, the double-sided display device may be connected to the Internet and a computer, thereby performing functions such as email, web browsing, banking and game. A standardized general-purpose OS may be used for these various functions.

Accordingly, the double-sided display device described in the present invention may perform various user-friendly functions, by freely adding or deleting various applications to or from the general-purpose OS kernel. The double-sided display device is applicable to a digital signage.

The double-sided display device may be a network TV, an HBBTV, a smart TV, an LED TV, an OLED TV, etc. and, in some cases, is applicable to a smartphone.

Figure 1:
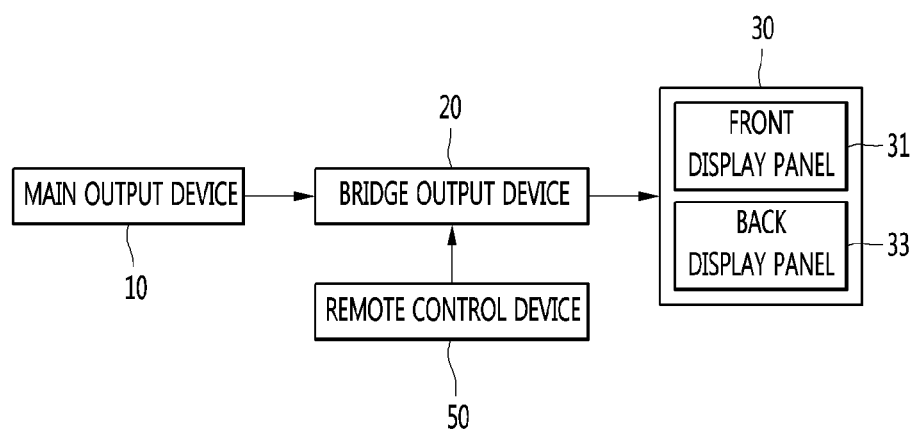
FIG. 1 is a diagram schematically illustrating the configuration of a double-sided display device according to an embodiment of the present invention.

FIG. 1 is a diagram schematically illustrating the configuration of a double-sided display device according to an embodiment of the present invention.

The double-sided display device according to the embodiment of the present invention may include a main output device 10, a bridge output device 20 and a double-sided display panel 30.

The main output device 10 may control operation of the bridge output device 20 and the double-sided display panel 30. The main output device 10 may include two main boards. The main boards may control a front display panel 31 and a back display panel 33, respectively.

The main output device 10 may transmit an external image to the bridge output device 20 through an internal control process. The main output device 10 may output an image to the bridge output device 20 through a high definition multimedia interface (HDMI) output terminal. To this end, the bridge output device 20 may include an HDMI input terminal in order to receive an image from the main output device 10.

The bridge output device 20 may output the image received from the main output device 10 to the double-sided display panel 30.

The bridge output device 20 may perform some of the functions of the main output device 10. The bridge output device 20 may transmit the image received from the main output device 10 to a timing controller. The bridge output device 20 may include an infrared (IR) reception unit to receive an IR signal from a remote control device 50. The bridge output device 20 may transmit the received IR signal to the main output device 10.

The bridge output device 20 may include two sub boards. The sub boards may output the image received from the main boards to the front display panel 31 or the back display panel 33.

The bridge output device 20 may include a temperature sensor. The bridge output device 20 may sense the temperature of the double-sided display panel 30 through the temperature sensor and transmit the temperature to the main output device 10.

The double-sided display panel 30 may include the front display panel 31 and the back display panel 33. The front display panel 31 and the back display panel 33 may display the same image or different images.

The double-sided display device may be controlled according to a request received from the remote control device 50. The remote control device 50 may include a radio frequency (RF) module for transmitting and receiving a signal to and from the double-sided display device according to the RF communication standard and an IR module for transmitting and receiving a signal to the double-sided display device according to the IR communication standard. In addition, the remote control device 50 may include a Bluetooth module for transmitting and receiving a signal to and from the double-sided display device according to the Bluetooth communication standard. In addition, the remote control device 50 may include a NFC (Near Field Communication) module for transmitting and receiving a signal to and from the double-sided display device according to the NFC communication standard and a wireless local area network (WLAN) module for transmitting and receiving a signal to and from the double-sided display device according to the WLAN communication standard.

The remote control device 50 may transmit commands related to power on/off, channel change, volume change, etc. to the double-sided display device through the IR module.

Figure 2:
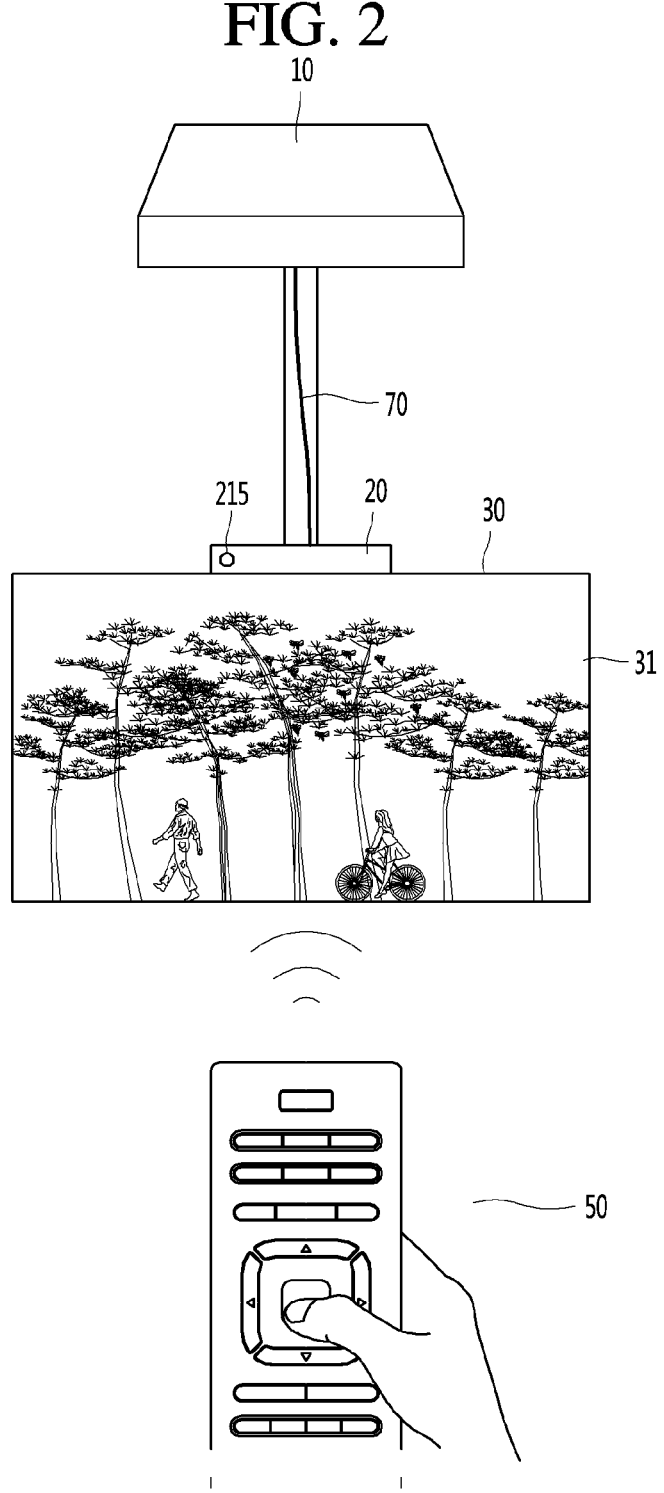
FIG. 2 is a diagram illustrating the actual configuration of the double-sided display device according to an embodiment of the present invention.
Figure 3:
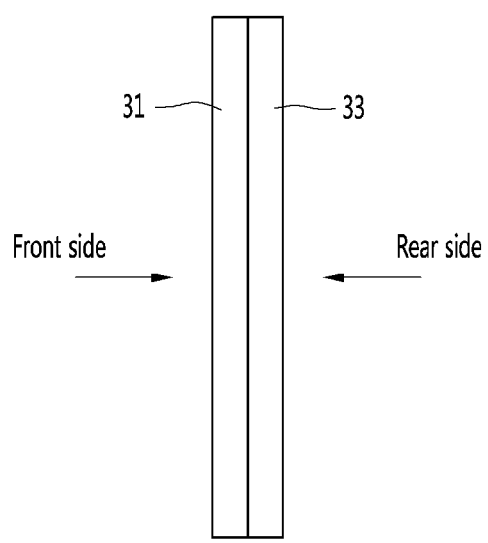
FIG. 3 is a diagram illustrating arrangement of a double-sided display panel according to an embodiment of the present invention.

FIG. 2 is a diagram illustrating the actual configuration of the double-sided display device according to an embodiment of the present invention, and FIG. 3 is a diagram illustrating arrangement of the double-sided display panel according to an embodiment of the present invention.

Referring to FIG. 2, the main output device 10 may be spaced apart from the bridge output device 20 by a predetermined distance. The main output device 10 may be connected to the bridge output device 20 by a wire 70 without being limited thereto, or may be connected wirelessly. The main output device 10 may perform communication with the bridge output device 20 through the wire 70.

The bridge output device 20 may be provided above the double-sided display panel 30, without being limited thereto. The bridge output device 20 may include an IR reception unit 215 which will be described below, and receive various input signals or requests from the remote control device 50 through the IR reception unit 215. The IR reception unit 215 may transmit the input signals or requests received from the remote control device 50 to the main output device 10.

Referring to FIG. 3, the double-sided display panel 30 may include the front display panel 31 and the back display panel 33. The front display panel 31 may be disposed on the front side of the line of sight of a user and the back display panel 33 may be disposed on the back side of the line of sight of the user. The front display panel 31 and the back display panel 33 may be adhered to each other, which is merely exemplary, or may be spaced apart from each other by a predetermined distance.

The user may manipulate the image output and power state of the double-sided display panel 30 through buttons provided on the remote control device 50.

Figure 4:
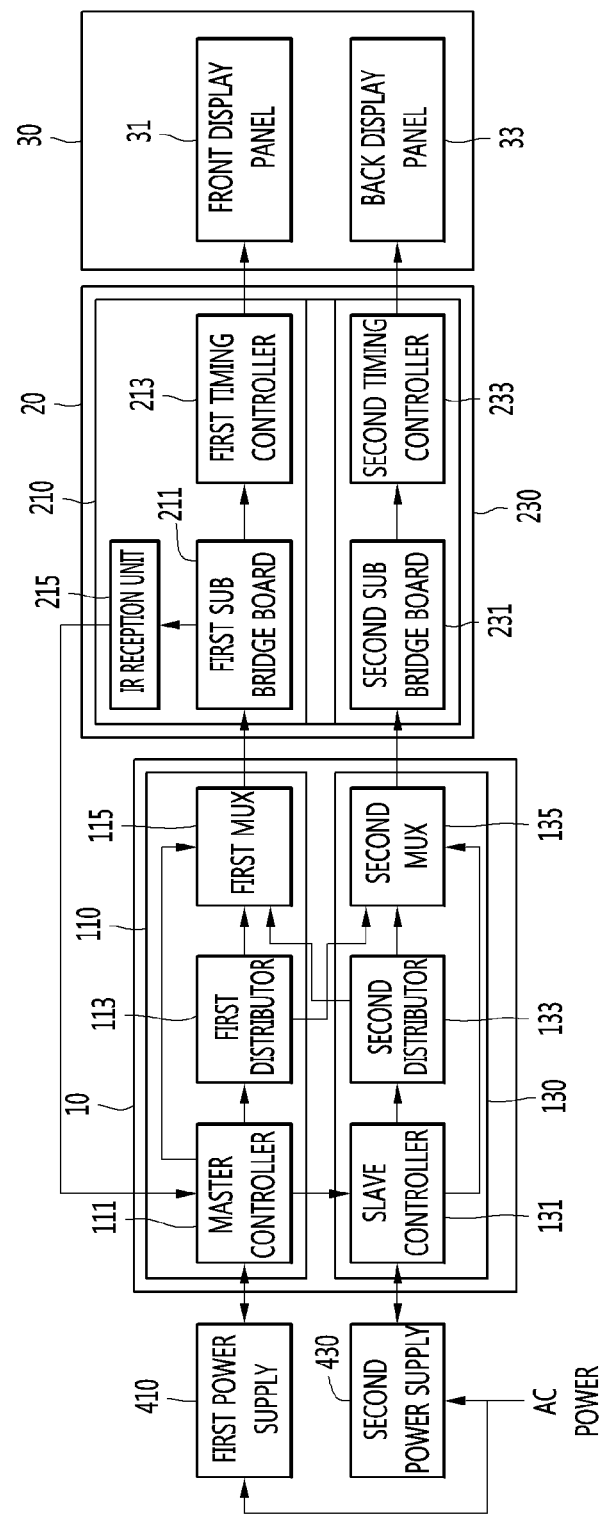
FIG. 4 is a block diagram illustrating the configuration of the double-sided display device according to an embodiment of the present invention in detail.

FIG. 4 is a block diagram illustrating the configuration of the double-sided display device according to an embodiment of the present invention in detail.

Referring to FIG. 4, the double-sided display device may include a main output device 10, a bridge output device 20 and a display panel 30.

The main output device 10 may include a first main board 110 and a second main board 130. The first main board 110 may control overall operation of the main output device 10. The first main board 110 may correspond to the front display panel 31 and control operation of the front display panel 31. The second main board 130 may correspond to the back display panel 33 and control operation of the back display panel 33.

The first main board 110 may receive power from a first power supply 410, and the second main board 130 may receive power from a second power supply 430. The power supplies may receive AC power from an outside and transmit the AC power to the main output device 10.

The first main board 110 may include a master controller 111, a first distributor 113 and a first multiplexer (MUX) 115.

The second main board 130 may include a slave controller 131, a second distributor 133 and a second MUX 135.

The master controller 111 may control operation of the main output device 10. The master controller 111 may transmit a first image received from the outside to the first distributor 113. The master controller 111 may control operation of the slave controller 131. The master controller 111 may transmit a control command to the slave controller 131 through a wired or wireless communication interface.

The master controller 111 may generate a control command based on a request received from the IR reception unit 215 provided in the bridge output device 20. The control command may include a command for controlling image output of the double-sided display panel 30 and a command for controlling the power of the double-sided display panel 30.

The master controller 111 may transmit the control command to the first MUX 115 to control operation of the first MUX 115.

The slave controller 131 may control operation of the second main board 130. The slave controller 131 may transmit a second image received from the outside to the second distributor 133.

The master controller 111 and the slave controller 131 may scale images received from the outside and deliver the images to the distributors, respectively. That is, the master controller 111 and the slave controller 131 may scale the received images in a format suitable to be output by the double-sided display panel 30.

The first distributor 113 may distribute the first image received from the master controller 113 to the first MUX 115 and the second MUX 135.

The second distributor 133 may distribute the second image received from the slave controller 131 to the first MUX 115 and the second MUX 135.

The first MUX 115 may output any one of the first image received from the first distributor 113 and the second image received from the second distributor 133 through an HDMI output port based on an image output control command received from the master controller 111. The first MUX 115 may output only the first image between the first image received from the first distributor 113 and the second image received from the second distributor 133 based on a low signal received from the master controller 111. The first MUX 115 may output only the second image between the first image received from the first distributor 113 and the second image received from the second distributor 133 based on a high signal received from the master controller 111.

The second MUX 135 may output any one of the first image received from the first distributor 113 and the second image received from the second distributor 133 through the HDMI port based on an image output control command received from the slave controller 131. The second MUX 135 may output only the second image between the first image received from the first distributor 113 and the second image received from the second distributor 133 based on a low signal received from the slave controller 131. The second MUX 135 may output only the first image between the first image received from the first distributor 113 and the second image received from the second distributor 133 based on a high signal received from the slave controller 131.

Operation of the first MUX 115 and the second MUX 135 will be described in detail below.

The bridge output device 20 may include a first bridge board 210 and a second bridge board 230.

The first bridge board 210 may include a first sub bridge board 211, a first timing controller 213 and an IR reception unit 215.

The first sub bridge board 211 may deliver the image output from the first main board 110 to the first timing controller 213. The first sub bridge board 211 may include an HDMI input port for receiving the image output from the first MUX 115.

The first timing controller 213 may output the image received from the first sub bridge board 211 to the front display panel 31. The first timing controller 213 may control the drive timing of the image displayed on the front display panel 31 based on a timing synchronization signal.

The second bridge board 230 may include a second sub bridge board 231 and a second timing controller 233.

The IR reception unit 215 may receive an IR (infrared) signal from the remote control device 50. The IR reception unit 215 may deliver the received IR signal to the master controller 111 of the main output device 10. Although the IR reception unit 215 is described in FIG. 4, the present invention is not limited thereto and the input signal may be received from the remote control device 50 through various communication methods such as Bluetooth, ultra wideband (WB), ZigBee or RF communication methods.

In addition, although it is assumed that the IR reception unit 215 is provided in the bridge output device 20, the present invention is not limited thereto and the IR reception unit 215 may be provided in the main output device 10 or the double-sided display panel 30 or may be independently provided.

The second sub bridge board 231 may deliver the image output from the second main board 130 to the second timing controller 233. The second sub bridge board 231 may include an HDMI input port for receiving the image output from the second MUX 135.

The second timing controller 233 may output the image received from the second sub bridge board 231 to the back display panel 33. The second timing controller 233 may control the drive timing of the image displayed on the back display panel 33 based on a timing synchronization signal.

Although the first timing controller 213 and the second timing controller 233 are provided in the bridge output device 20 in FIG. 4, this is merely exemplary and the first timing controller 213 and the second timing controller 233 may be configured independently of the bridge output device 20. As another example, the first timing controller 213 may be provided in the front display panel 31 and the second timing controller 233 may be provided in the back display panel 33.

The display panel 30 may include the front display panel 31 and the back display panel 33. The front display panel 31 may display the image received from the first sub bridge board 231. The back display panel 33 may display the image received from the second sub bridge board 233.

FIG. 5 is a diagram illustrating the detailed configuration of a MUX according to an embodiment of the present invention, and FIG. 6 is a table showing which image is output according to a control signal input to an image selection pin provided in the MUX according to an embodiment of the present invention.

Although the structure of the first MUX 115 is described in FIG. 5, the second MUX 135 may have the same structure. The first MUX 115 may be controlled by the master controller 111. The first image from the first distributor 113 may be input to the first MUX 115 through a plurality of pins corresponding to channel A and the second image from the second distributor 133 may be input to the first MUX 115 through a plurality of pins corresponding to channel B.

The master controller 111 may transmit a low signal or a high signal to the image selection pin SEL2 based on the image output control command. The low signal transmitted to the first MUX 115 may be a signal for controlling the first MUX 115 such that the first MUX 115 outputs the first image input to the master controller 111, and the high signal transmitted to the first MUX 115 may be a signal for controlling the first MUX 115 such that the first MUX 115 outputs the second image input to the slave controller 131.

If FIG. 5 is applied to the second MUX 135, the low signal transmitted to the second MUX 135 may be a signal for controlling the second MUX 135 such that the second MUX 135 outputs the second image input to the slave controller 131, and the high signal transmitted to the second MUX 135 may be a signal for controlling the second MUX 135 such that the second MUX 135 outputs the first image input to the master controller 111.

Referring to FIG. 6, when the low signal L is input to the image selection pin SEL2, the first MUX 115 outputs, to the first sub bridge board 211, the first image input to the first main board 110 corresponding to channel A. In contrast, when the high signal H is input to the image selection pin SEL2, the first MUX 115 outputs, to the second sub bridge board 231, the second image input to the second main board 130 corresponding to channel B.

Next, the method of operating the double-sided display device according to the embodiment of the present invention will be described based on the description of FIGS. 1 to 6.

Figure 7:
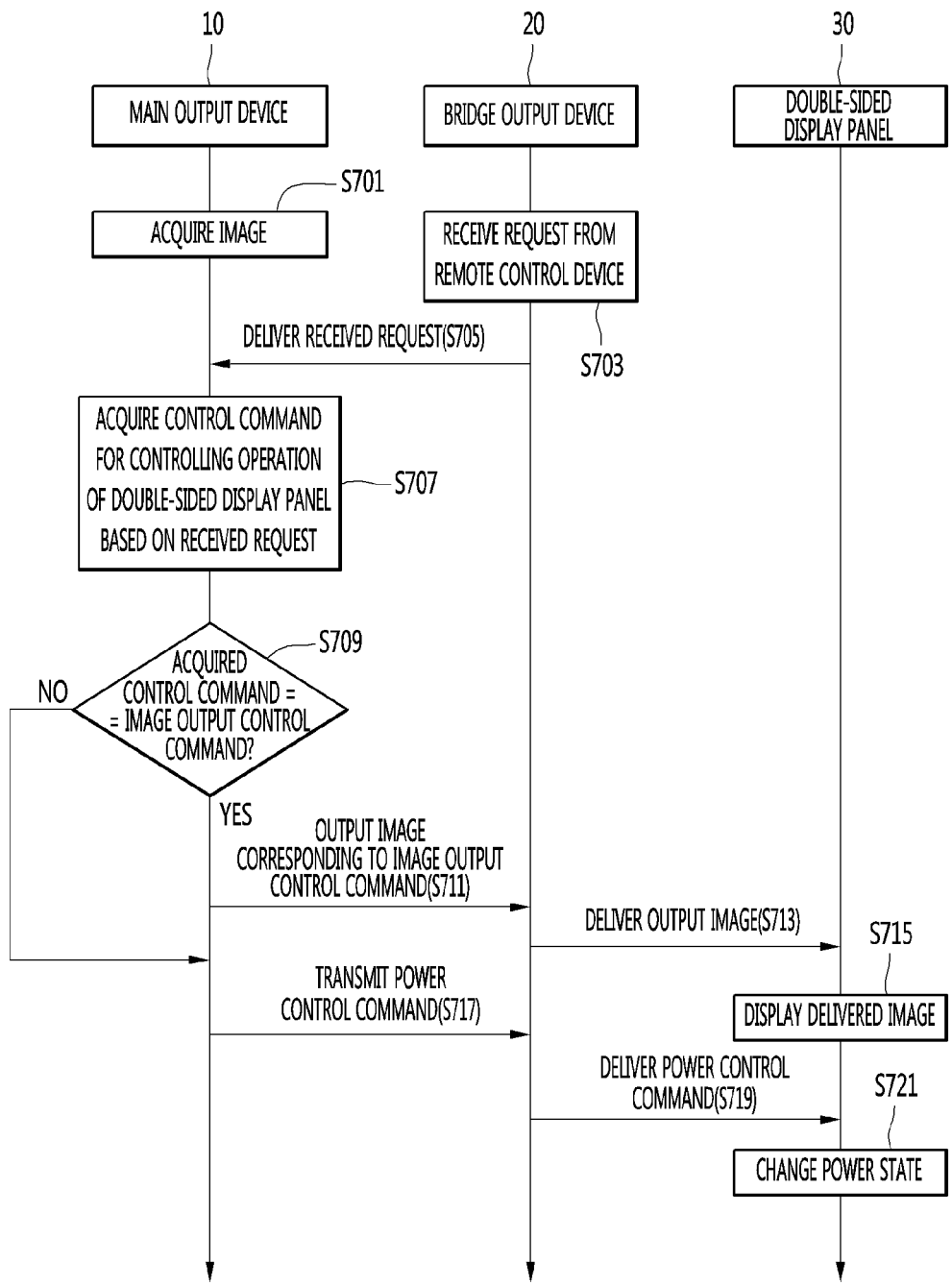
FIG. 7 is a ladder diagram illustrating a method of operating a double-sided display device according to an embodiment of the present invention.

FIG. 7 is a ladder diagram illustrating a method of operating a double-sided display device according to an embodiment of the present invention.

Hereinafter, the method of operating the double-sided display device according to the embodiment of the present invention shown in FIG. 7 will be described with reference to the description of FIGS. 1 to 6.

Referring to FIG. 7, the main output device 10 acquires an image received from the outside (S701).

The bridge output device 20 receives a request for controlling operation of the double-sided display panel 30 from the remote control device 50 (S703), and delivers the received request to the main output device 10 (S705). In one embodiment, the IR reception unit 215 included in the bridge output device 10 may receive the request from the remote control device 50. The received request may be a request for performing operation corresponding to a specific key button provided on the remote control device 50 of the double-sided display panel 30.

In another embodiment, if the IR reception unit 215 is provided in the main output device 10, the main output device 10 may receive the request from the remote control device 50. In this case, steps S703 and S705 may be omitted.

In one embodiment, the master controller 111 provided in the first main board 110 of the main output device 10 may receive the request from the IR reception unit 215.

The main output device 10 acquires a control command for controlling operation of the double-sided display panel based on the request received from the bridge output device 20 (S707). In one embodiment, the control command may be an image output control command for controlling image output of the double-sided display panel 30.

The image output control command may be a command for enabling the front display panel 31 and the back display panel 33 to display different images.

The image output control command may be a command for enabling the front display panel 31 and back display panel 33 to swap the respective images with each other and to display the swapped images.

The image output control command may be a command for displaying the image displayed on one of the front display panel 31 and the back display panel 33 to be equally displayed on the other display panel.

In another embodiment, the control command may be a power control command for controlling the power state of the double-sided display panel 30. The power control command may be a command for turning on or off the front display panel 31 provided in the double-sided display panel 30. The power control command may be a command for turning on or off the back display panel 33. The power control command may be a command for simultaneously turning on or off the front display panel 31 and the back display panel 33.

The main output device 10 determines whether the acquired control command is an image output control command for controlling image output of the double-sided display panel 30 or a command for controlling the power state of the double-sided display panel 30 (S709).

When the acquired control command is an image output control command for controlling image output of the double-sided display panel 30, the main output device 10 outputs the image corresponding to the image output control command to the bridge output device 20 (S711).

The bridge output device 20 delivers the image output from the main output device 10 to the display panel 30 (S711).

The double-sided display panel 30 displays the image received from the bridge output device 10 (S713).

Hereinafter, steps S701 to S713 will be described in detail.

FIG. 8 is a diagram illustrating a process of controlling a MUX according to the type of an image output control command according to an embodiment of the present invention.

Hereinafter, the first image may be an image input to the master controller 111 and the second image may be an image input to the slave controller 131. The first image and the second image may be different from each other.

In addition, the low signal may be a signal for changing the state of the image selection pin SEL2 provided in the MUX shown in FIG. 5 to a low state and the high signal may be a signal for changing the state of the image selection pin SEL2 to a high state.

Specifically, the low signal transmitted to the first MUX 115 may be a signal for controlling the first MUX 115 such that the first MUX 115 outputs the first image input to the master controller 111, and the high signal transmitted to the first MUX 115 may be a signal for controlling the first MUX 115 such that the first MUX 115 outputs the second image input to the slave controller 131.

In addition, the low signal transmitted to the second MUX 135 may be a signal for controlling the second MUX 135 such that the second MUX 135 outputs the second image input to the slave controller 131, and the high signal transmitted to the second MUX 135 may be a signal for controlling the second MUX 135 such that the second MUX 135 outputs the first image input to the master controller 111.

Referring to FIG. 8, the image output control command may be classified into four types. That is, the image output control command may be any one of an individual image output control command, a swap image output control command, a master duplication image output control command, a slave duplication image output control command.

The individual image output (1:1 output) control command may be a command for outputting the first image input to the master controller 111 to the front display panel 31 and outputting the second image input to the slave controller 131 to the back display panel 33. When the individual image output control command is acquired, the master controller 111 may transmit, to the first MUX 115, the low signal for changing the state of the image selection pin SEL2 provided in the first MUX 115 to the low state. In addition, the slave controller 131 may transmit, to the second MUX 135, the low signal for changing the state of the image selection pin SEL2 provided in the second MUX 135 to the low signal.

The swap image output control command may be a command for outputting the first image input to the master controller 111 to the back display panel 33 and outputting the second image input to the slave controller 131 to the front display panel 31. When the swap image output control command is acquired, the master controller 111 may transmit, to the first MUX 115, the high signal for changing the state of the image selection pin SEL2 provided in the first MUX 115 to the high state. In addition, the slave controller 131 may transmit, to the second MUX 135, the high signal for changing the state of the image selection pin SEL2 provided in the second MUX 135 to the high signal.

The master duplication image output control command may be a command for outputting the first image input to the master controller 111 to the front display panel 31 and the back display panel 33. That is, the master duplication image output control command may be a command for duplicating the first image displayed on the front display panel 31 to the back display panel 33. When the master duplication image output control command is acquired, the master controller 111 may transmit, to the first MUX 115, the low signal for changing the state of the image selection pin SEL2 provided in the first MUX 115 to the low signal. In addition, the slave controller 131 may transmit, to the second MUX 135, the high signal for changing the state of the image selection pin SEL2 provided in the second MUX 135 to the high signal.

The slave duplication image output control command may be a command for outputting the second image input to the slave controller 131 to the front display panel 31 and the back display panel 33. That is, the slave duplication image output control command may be a command for duplicating the second image displayed on the back display panel 33 to the front display panel 31. When the slave duplication image output control command is acquired, the master controller 111 may transmit, to the first MUX 115, the high signal for changing the state of the image selection pin SEL2 provided in the first MUX 115 to the high signal. In addition, the slave controller 131 may transmit, to the second MUX 135, the low signal for changing the state of the image selection pin SEL2 provided in the second MUX 135 to the low signal.

Hereinafter, the process of, at the double-sided display device, controlling operation of the double-sided display panel based on the image output control command will be described in detail.

Figure 9:
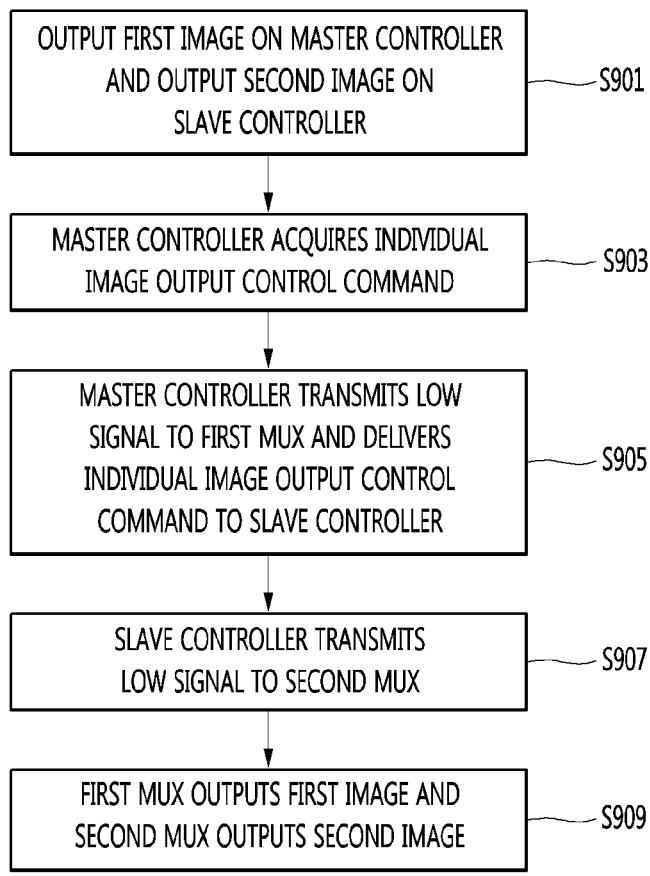
FIGS. 9 to 11 are diagrams illustrating a process of controlling operation of a double-sided display device based on an individual image output control command according to an embodiment of the present invention.
Figure 10:
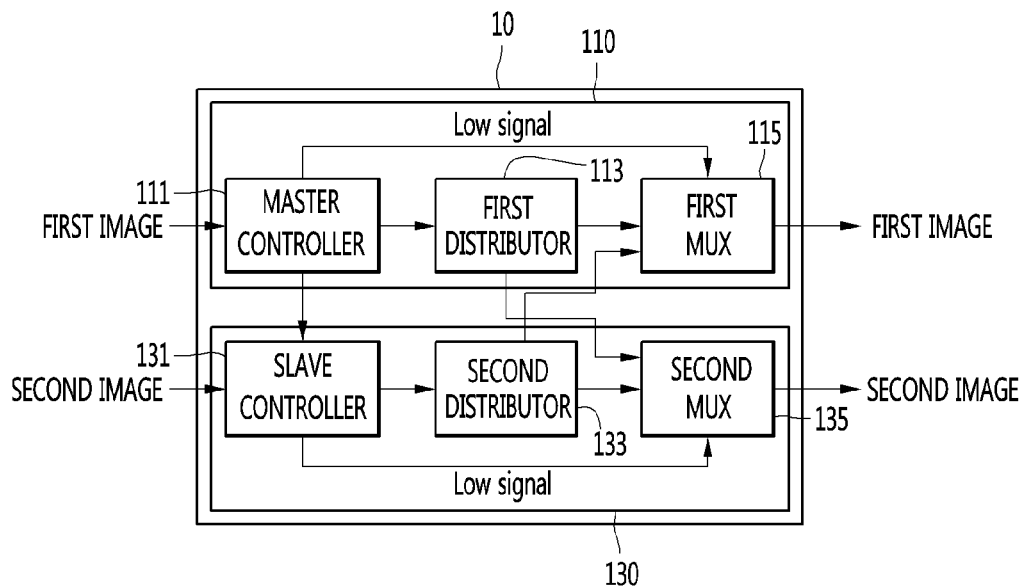
Figure 11:
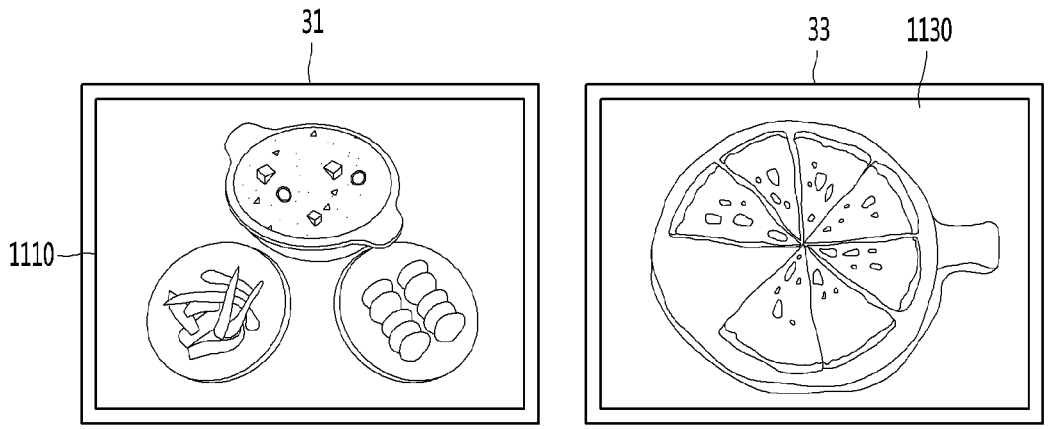

FIGS. 9 to 11 are diagrams illustrating a process of controlling operation of a double-sided display device based on an individual image output control command according to an embodiment of the present invention.

Referring to FIGS. 9 and 10, the master controller 111 outputs a first image received from an outside and the slave controller 131 outputs a second image received from an outside (S901). The first image and the second image may be different from each other.

The master controller 111 acquires the individual image output control command (S903). In one embodiment, the master controller 111 may acquire the individual image output control command based on the input signal received from the IR reception unit 215 provided in the second bridge board 210.

The master controller 111 transmits a low signal to the first MUX 115 based on the individual image output control command and delivers the individual image output control command to the slave controller 131 (S905). The master controller 111 may transmit the low signal to the image selection pin SEL2 provided in the first MUX 115 and control the state of the image selection pin SEL2.

The slave controller 131 transmits the low signal to the second MUX 135 based on the delivered individual image output control command (S907). The slave controller 131 may transmit the low signal to the image selection pin (not shown) provided in the second MUX 135 and control the state of the image selection pin SEL2.

The first MUX 115 outputs the first image based on the low signal received from the master controller 111, and the second MUX 135 outputs the second image based on the low signal received from the slave controller 131 (S909). Referring to FIG. 11, the front display panel 31 of the double-sided display panel 30 displays the first image 1110 and the back display panel 33 displays the second image 1130. The first image 1110 may be an image input to the master controller 111 and the second image 1130 may be an image input to the slave controller 131. That is, each display panel displays an image input to a controller corresponding thereto. The individual image output control command may be a default command which is not based on a separate input signal from the remote control device 50. That is, the display state of each panel shown in FIG. 11 may be a default state.

Figure 12:
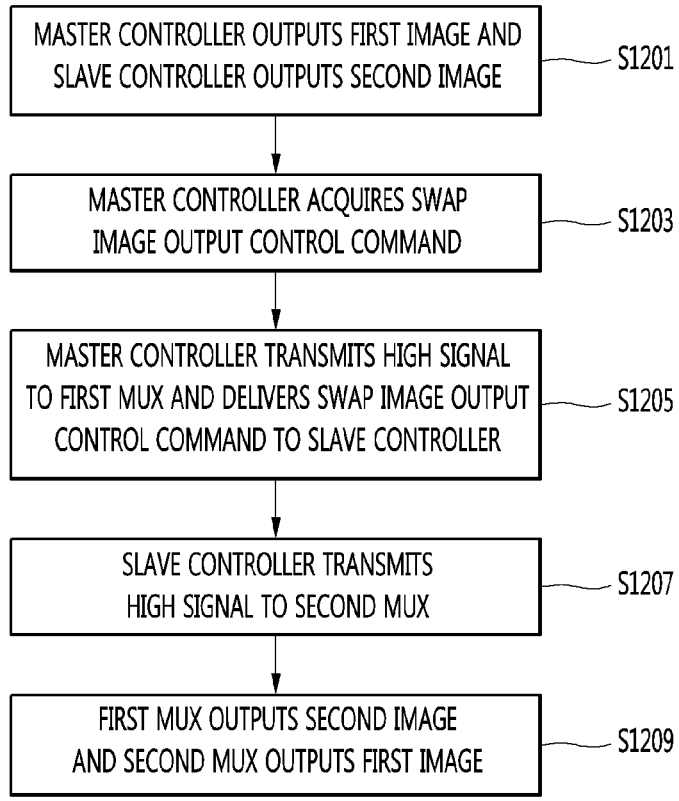
Figure 13:
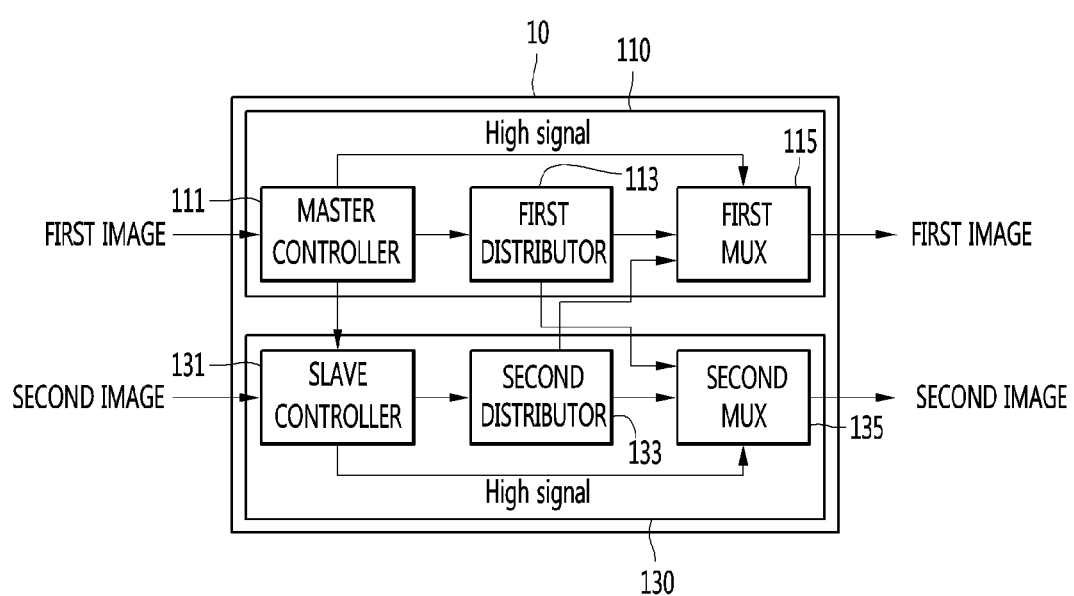

FIGS. 12 to 14 are diagrams illustrating a process of controlling operation of a double-sided display device based on a swap image output control command according to an embodiment of the present invention.

Referring to FIGS. 12 and 13, the master controller 111 outputs a first image received from an outside and the slave controller 131 outputs a second image from an outside (S1201). The first image and the second image may be different from each other.

The master controller 111 acquires a swap image output control command (S1203). In one embodiment, the master controller 111 may acquire the swap image output control command based on the input signal received from the IR reception unit 215 provided in the second bridge board 210.

The master controller 111 transmits a high signal to the first MUX 115 based on the swap image output control command and delivers the swap image output control command to the slave controller 131 (S1205). The master controller 111 may transmit a high signal to the image selection pin SEL2 provided in the first MUX 115 and control the state of the image selection pin SEL2.

The slave controller 131 transmits a high signal to the second MUX 135 based on the delivered swap image output control command (S1207). The slave controller 131 may transmit the high signal to the image selection pin (not shown) provided in the second MUX 135 and control the state of the image selection pin SEL2.

The first MUX 115 outputs the second image based on the high signal received from the master controller 111, and the second MUX 135 outputs the first image based on the high signal received from the slave controller 131 (S1209). Referring to FIG. 14, the front display panel 31 of the double-sided display panel 30 displays the second image 1110 and the back display panel 33 displays the first image 1110. The first image 1110 is an image input to the master controller 111 and the second image 1130 is an image input to the slave controller 131. Based on the display state of FIG. 11, the double-sided display panel 30 may display the swapped images based on the swap image output control command.

The user may control operation of the double-sided display device through the remote control device 50. That is, the user may deliver various control commands to the double-sided display device through buttons provided on the remote control device 50. The remote control device 50 may include a power button 51, a double-side selection button 52, a front-side selection button 53, a back-side selection button 54, a mirroring button 55 and a swapping button 56.

The power button 51 may be a button for changing the power state of the double-sided display panel 30.

The double-sided selection button 52 may be a button for simultaneously selecting the front display panel 31 and the back display panel 33.

The front selection button 53 may be a button for selecting only the front display panel 31.

The back selection button 54 may be a button for selecting only the back display panel 33.

The mirroring button 55 may be a button for duplicating the image displayed on the front display panel 31 to the back display panel 33 or duplicate the image displayed on the back display panel 33 to the front display panel 31.

The swapping button 56 may be a button for swapping and displaying the image displayed on the front display panel 31 and the image displayed on the back display panel 33.

When the user presses the double-sided selection button 52 and then presses the swapping button 56, as shown in FIG. 14, the panels may swap the images with each other and display the swapped images.

FIGS. 15 to 18 are diagrams illustrating a process of controlling operation of a double-sided display device based on a duplication image output control command according to an embodiment of the present invention.

Figure 15:
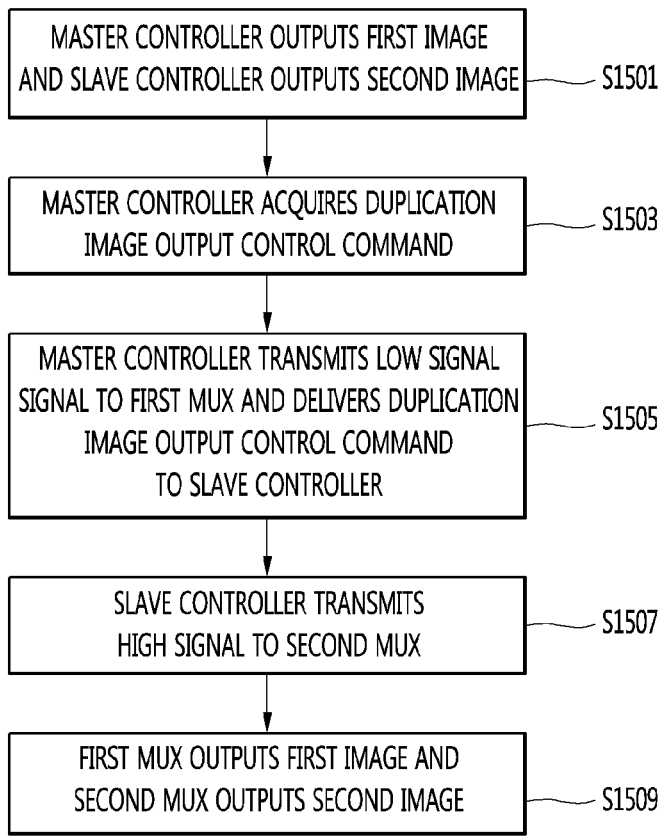
Figure 16:
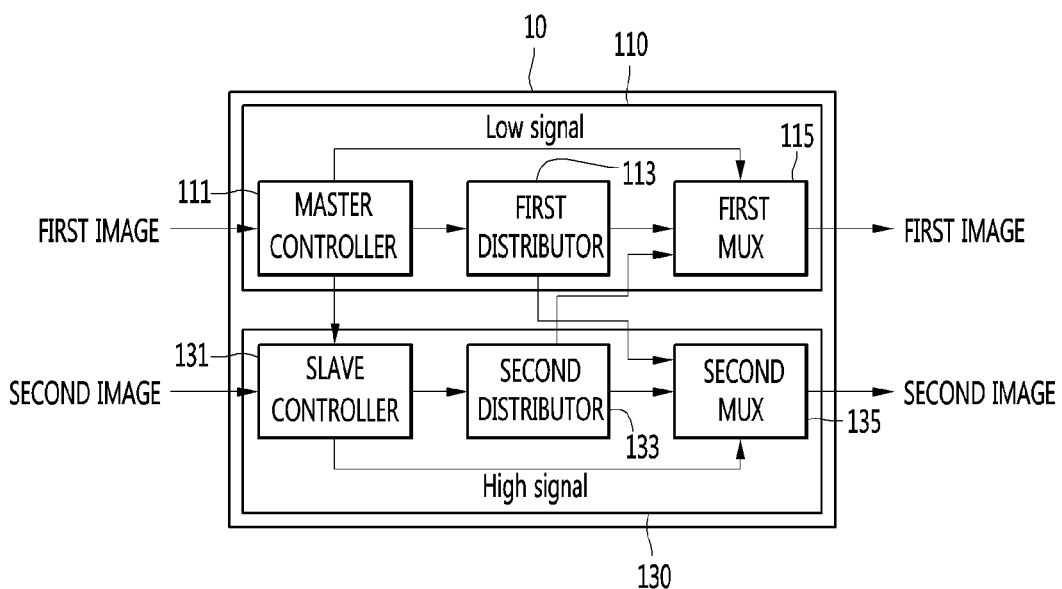

Referring to FIGS. 15 and 16, the master controller 111 outputs the first image received from an outside and the slave controller 131 output the second image received from an outside (S1501). The first image and the second image may be different.

The master controller 111 acquires the duplication image output control command (S1503). In one embodiment, the master controller 111 may acquire the duplication image output control command based on the input signal received from the IR reception unit 215 provided in the second bridge board 210. In FIGS. 15 and 16, the duplication image output control command may be the master duplication image output control command described with reference to FIG. 8. The master duplication image output control command may be a command for duplicating the first image displayed on the front display panel 31 to the back display panel 33.

The master controller 111 transmits the low signal to the first MUX 115 based on the duplication image output control command and delivers the swap image output control command to the slave controller 131 (S1505). The master controller 111 may transmit the low signal to the image selection pin SEL2 provided in the first MUX 115 and control the state of the image selection pin SEL2.

The slave controller 131 transmits the high signal to the second MUX 135 based on the delivered duplication image output control command (S1507). The slave controller 131 may transmit the high signal to the image selection pin (not shown) provided in the second MUX 135 and control the state of the image selection pin SEL2.

The first MUX 115 outputs the first image based on the low signal received from the master controller 111 and the second MUX 135 outputs the first image based on the high signal received from the slave controller 131 (S1509). Referring to FIG. 17, the front display panel 31 of the double-sided display panel 30 displays the first image 1110 and the back display panel 33 displays the first image 1110. The first image 1110 is an image input to the master controller 111. Based on the display state of FIG. 11, the back display panel 33 switch the second image 1130 to the first image 1100 based on the master duplication image output control command and the display the first image 1100. The front display panel 31 maintains display of the first image 1110.

When the user presses the front selection button 53 and then presses the mirroring button 55, as shown in FIG. 17, the first image 1110 displayed on the front display panel 31 may be duplicated to and displayed on the back display panel 33.

FIG. 18 shows an image which is being displayed on each display panel when the slave duplication image output control command is received. The slave duplication image output control command may be a command for duplicating the second image displayed on the back display panel 33 to the back display panel 33.

When the user presses the back selection button 54 and then presses the mirroring button 55, as shown in FIG. 18, the first image 1130 displayed on the back display panel 33 may be duplicated to and displayed on the front display panel 31.

FIG. 7 will be described again.

Meanwhile, when the acquired control command is a power control command for controlling power of the double-sided display panel 30 (S709), the main output device 10 transmits the power control command to the bridge output device 20 (S717). In one embodiment, when the request received from the remote control device 50 is related to the power state change of the double-sided display panel 30, the IR reception unit 215 may transmit the received request to the master controller 111. The master controller 111 may acquire the power control command based on the received request. The master controller 111 may directly deliver the acquired control command to the first bridge board 211 and control the power state of the front display panel 31. For example, if the power control command is a command for turning the front display panel 31 on, the master controller 111 may directly deliver the power off command to the first sub bridge board 211 to turn the front display panel 31 off.

If the power control command is a command for turning the back display panel 31 off, the master controller 111 may transmit the power off command to the slave controller 131. The slave controller 131 may deliver the power off command to the second sub bridge board 231 to turn the back display panel 33 off.

The bridge output device 20 delivers the received power control command to the double-sided display panel 30 (S719), and the double-sided display panel 30 changes the power state based on the received power control command (S721).

In another embodiment, the IR reception unit 215 may not deliver the request related to the power state change received from the remote control device 50 to the master controller 111 but may directly deliver the request to the first sub bridge board 211. For example, when the power off command of the front display panel 31 is received through the IR reception unit 215, the first sub bridge board 211 may turn the front display panel 31 off according to the power off command.

Figure 19:
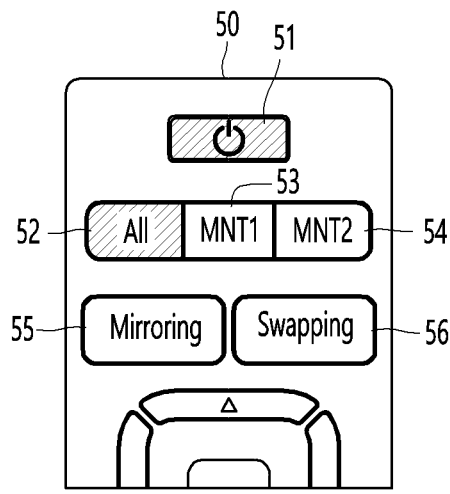
FIGS. 19 and 20 are diagrams illustrating a method of controlling a power state of a double-sided display panel through a remote control device according to an embodiment of the present invention.
Figure 20:
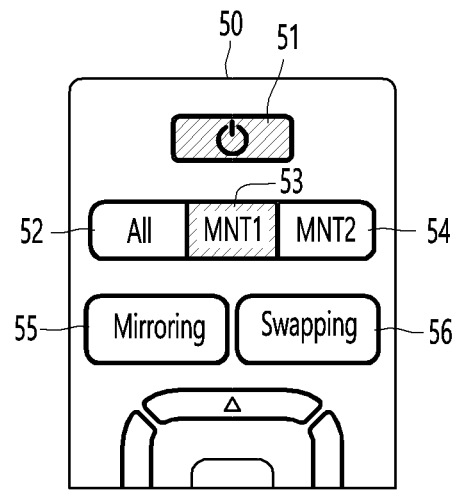

FIGS. 19 and 20 are diagrams illustrating a method of controlling a power state of a double-sided display panel through a remote control device according to an embodiment of the present invention.

Referring to FIG. 19, when the double-side selection button 52 is selected after selecting the power button 51, the remote control device 50 may transmit an input signal for turning the front display panel 31 and the back display panel 33 on or off to the IR reception unit 215.

The main output device 10 or the sub output device 20 may turn the front display panel 31 and the back display panel 33 on or off based on the received input signal.

Referring to FIG. 20, when the front-side selection button 53 is selected after selecting the power button 51, the remote control device 50 may transmit the input signal for turning the front display panel 31 on or off to the IR reception unit 215.

The main output device 10 or the sub output device 20 may turn the front display panel 31 on or off based on the received input signal.

Figure 21:
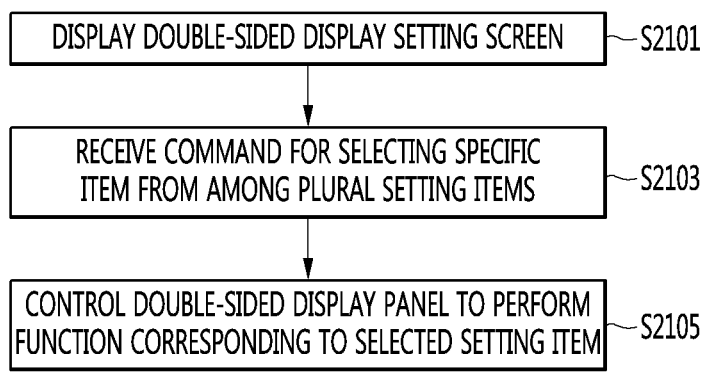
FIG. 21 is a diagram illustrating a method of operating a double-sided display device according to an embodiment of the present invention.

FIG. 21 is a diagram illustrating a method of operating a double-sided display device according to an embodiment of the present invention.

Hereinafter, FIG. 21 will be described with reference to description of FIGS. 1 to 20.

The double-sided display device displays a double-sided display setting screen (S2101). In one embodiment, the double-sided display device may display the double-sided display setting screen through any one of the front display panel 31 and the back display panel 33.

The bridge output device 20 of the double-sided display device may receive the IR signal from the remote control device 50 and deliver the received IR signal to the main output device 10. The main output device 10 may control the front display panel 31 or the back display panel 33 based on the delivered IR signal to display the double-sided display setting screen. The main output device 10 of the double-sided display device may be referred to as a controller (not shown).

In another embodiment, the double-sided display setting screen may be displayed on a separate terminal (not shown) for controlling operation of the double-sided display device. The terminal may be a smartphone, a tablet, a laptop, a PC, etc. The terminal may receive a request for displaying the double-sided display setting screen and display the double-sided display setting screen according to the received request. The user may receive the request for displaying the double-sided display setting screen and control operation of the double-sided display panel 30 according to the received request. The user may control operation of the double-sided display panel 30 through the double-sided display setting screen displayed on the terminal.

The double-sided display setting screen will be described with reference to the following drawings.

Figure 22:
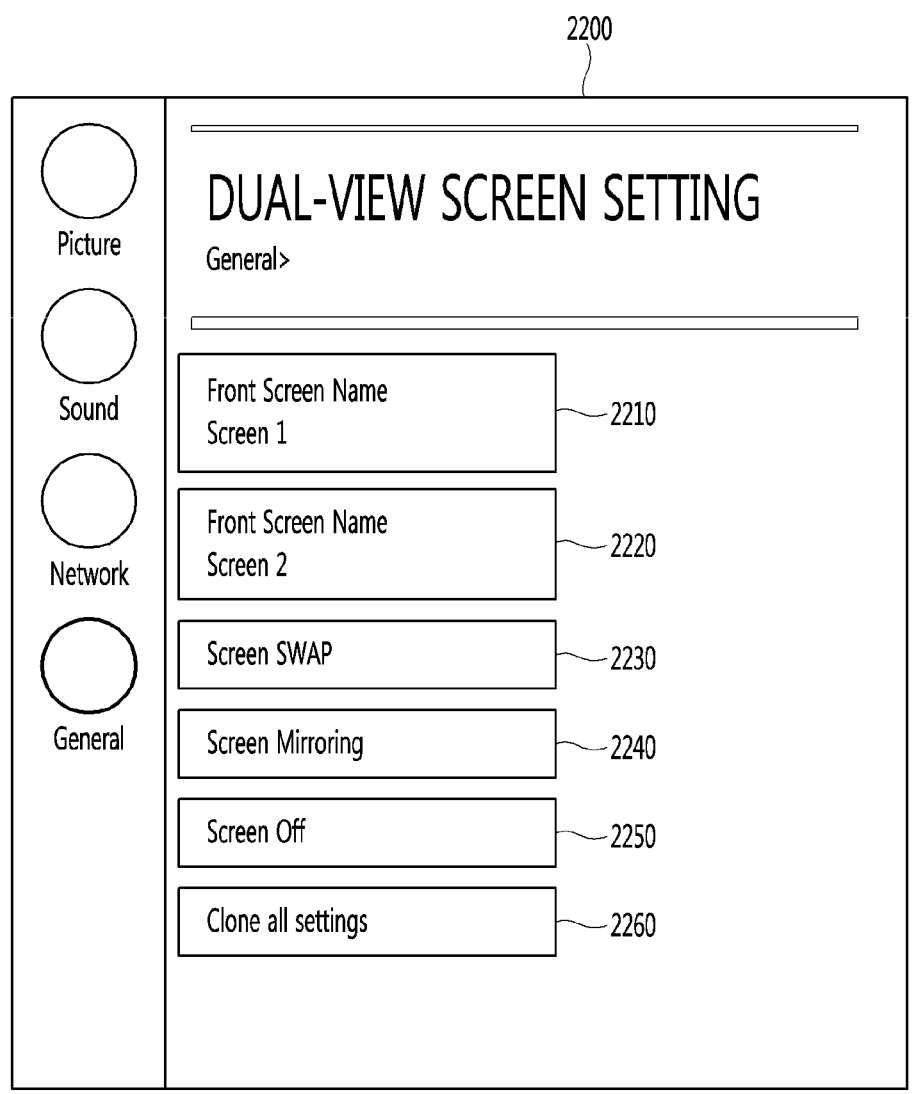
FIG. 22 is a diagram illustrating an example of a double-sided display setting screen according to an embodiment of the present invention.

FIG. 22 is a diagram illustrating an example of a double-sided display setting screen according to an embodiment of the present invention.

Referring to FIG. 22, the double-sided display setting screen 2200 may include a plurality of setting items 2210 to 2260. The plurality of setting items 2210 to 2260 may include a front display name item 2210, a back display name item 2220, a screen swap item 2230, a screen mirroring item 2240, a screen off item 2250 and a clone item 2260.

The front display name item 2210 may be an item for setting the name of the front display panel 31.

The back display name item 2220 may be an item for setting the name of the back display panel 33.

The screen swap item 2230 may be an item for swapping the first image displayed on the front display panel 31 with the second image displayed on the back display panel 33.

The screen mirroring item 2240 may be an item for setting the first image displayed on the front display panel 31 to be displayed on the back display panel 33 or setting the second image displayed on the back display panel 33 to be displayed on the front display panel 31.

The screen off item 2250 may be an item for turning at least one of the front display panel 31 and the back display panel 33 off.

The clone item 2260 may be an item for applying setting elements of any one display panel to anther display panel without change.

The setting items will be described below.

FIG. 21 will be described again.

The double-sided display device receives a command for selecting a specific item from among the plurality of setting items included in the double-sided display setting screen (S2103).

The double-sided display device controls the double-sided display panel 30 to perform a function corresponding to the selected setting item in response to the received command (S2105). In one embodiment, the controller of the double-sided display device may receive a command for selecting any one of the plurality of setting items from the remote control device 50 and control operation of the double-sided display panel 30 based on the received command.

Hereinafter, the process of controlling operation of the double-sided display panel 30 through the double-sided display setting screen 2200 will be described.

Figure 23:
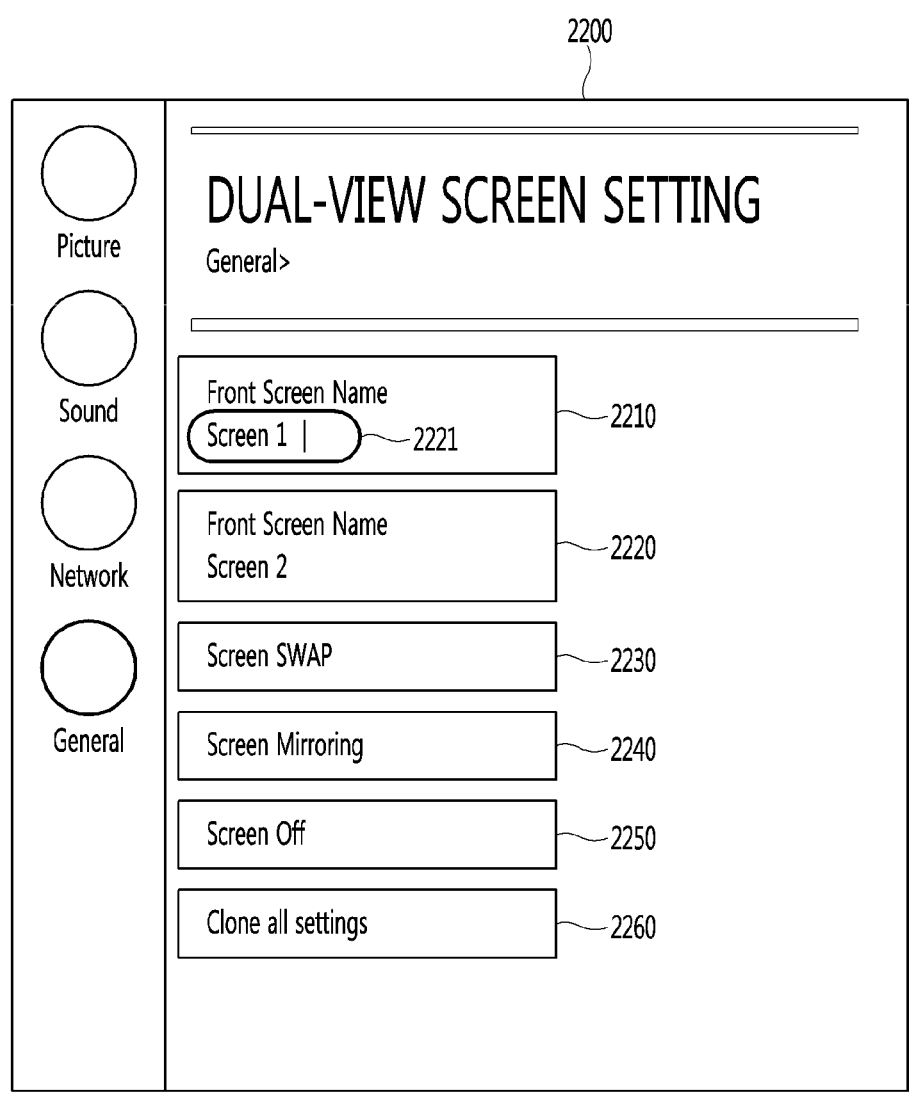
FIG. 23 is a diagram illustrating an example of inputting the name of each display panel according to an embodiment of the present invention.

FIG. 23 is a diagram illustrating an example of inputting the name of each display panel according to an embodiment of the present invention.

Referring to FIG. 23, the controller of the double-sided display device may receive a command for selecting the front display name item 2210 included in the double-sided display setting screen 2200 and display a name input field 2221 based on the received command. The user may input a name in the name input field 221 to set the name of the front display panel 31.

Figure 25:
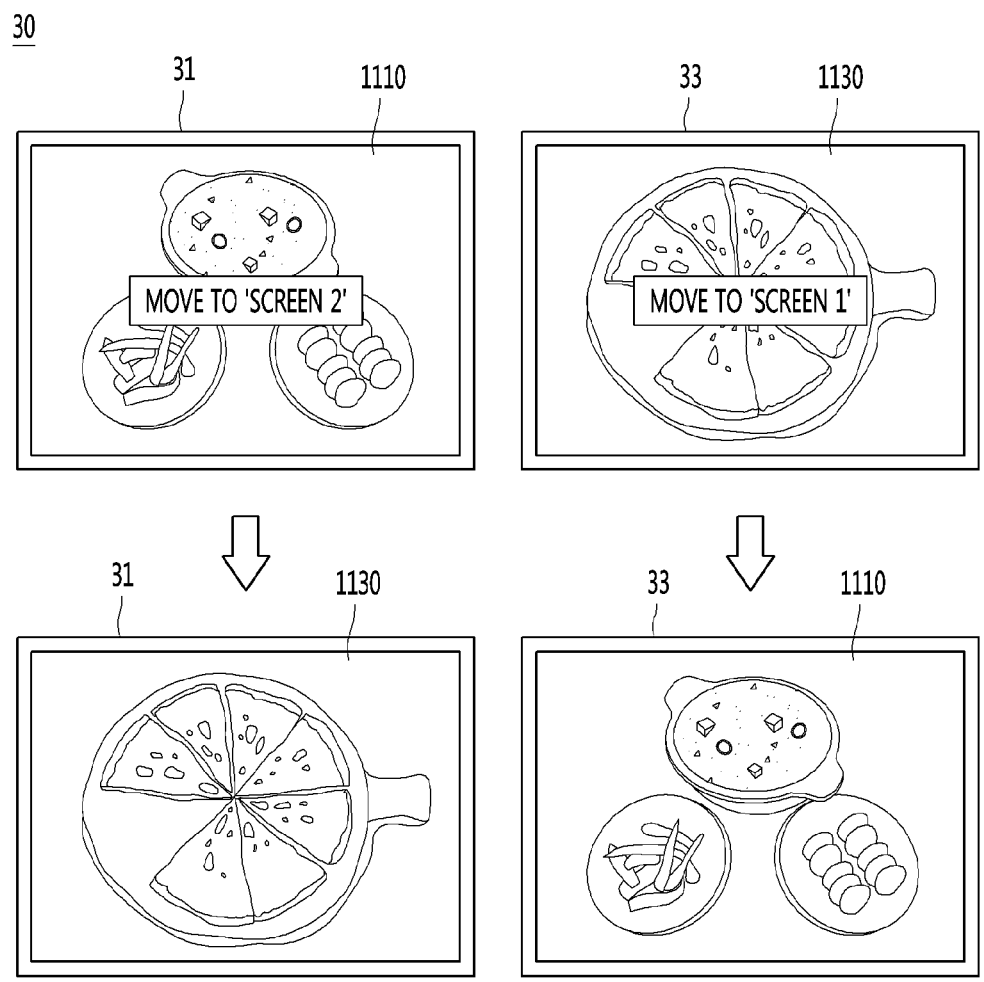

FIGS. 24 and 25 are diagrams a process of controlling a double-sided display panel through a screen swap item according to an embodiment of the present invention.

Referring to FIG. 24, the controller of the double-sided display device may highlight a screen swap item 2230 in response to a command for selecting the screen swap item 2230. At the same time, the controller may display a confirmation message window 2400 for checking whether a screen swap function is performed. The confirmation message window 2400 may include text indicating that the images of the contents displayed on the display panels may be swapped with each other. In FIG. 24, the command for selecting the screen swap item 2230 may correspond to the swap image output control command described with reference to FIGS. 12 to 14.

If an accept button 2410 included in the confirmation message window 2400 is selected, the controller may perform control such that the first image 1110 displayed on the front display panel 31 and the second image 1130 displayed on the back display panel 33 are swapped with each other and displayed as shown in FIG. 25. The controller of the double-sided display device may display a message 2510 indicating that the first image 1110 displayed on the front display panel 31 will be moved to the back display panel 33 through the front display panel 31 and a message 2530 indicating that the second image 1130 displayed on the back display panel 33 will be moved to the front display panel 31 through the back display panel 33, before swapping the image.

FIGS. 26 to 30 are diagrams a process of controlling a double-sided display panel through a mirroring item according to an embodiment of the present invention.

Referring to FIG. 26, the controller of the double-sided display device may highlight the screen mirroring item 2240 in response to a command for selecting the screen mirroring item 2240 included in the double-sided display setting screen 2200. At the same time, the controller may display the front mirroring item 2251 and the back mirroring item 2253. The front mirroring item 2251 may be an item for enabling the first image displayed on the front display panel 31 to be equally displayed on the back display panel 33. The back mirroring item 2253 may be an item for enabling the second image displayed on the back display panel 33 to be equally displayed on the front display panel 31. In FIG. 26, a command for selecting the front mirroring item 2251 or the back mirroring item 2253 may correspond to the duplication image output control command described with reference to FIGS. 15 to 18.

Figure 27:
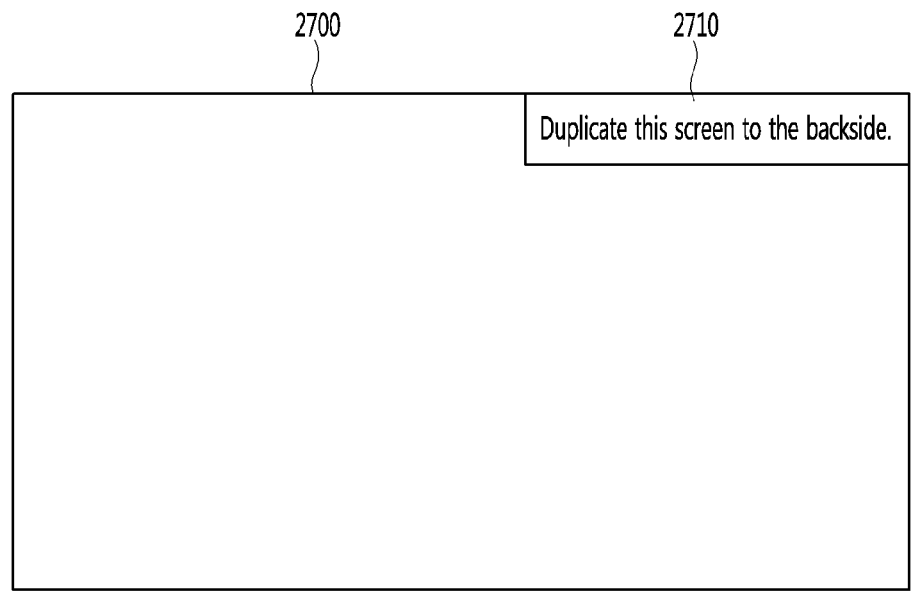
Figure 28:
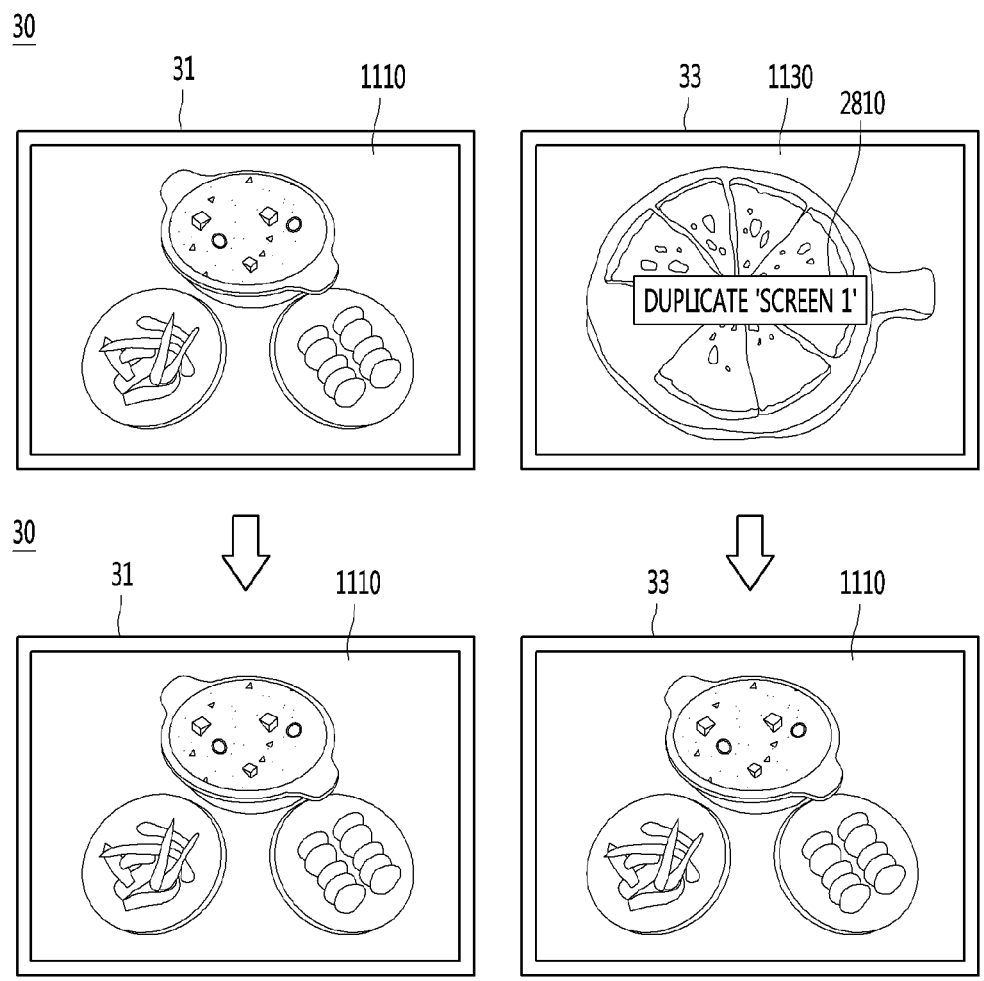

When the front mirroring item 2253 is selected, the controller may display an inquiry window 2600 for inquiring whether to duplicate the first image displayed on the front display panel 31 to the back display panel 33. The inquiry window 2600 may include a message indicating that the first image displayed on the front display panel 31 will be duplicated to the back display panel 33. When an accept button 2610 included in the inquiry window 2600 is selected, the controller of the double-sided display device may display a popup window 2710 indicating that a current screen is duplicated to the back display panel 33 through the front display panel 31 as shown in FIG. 27. Thereafter, the controller of the double-sided display device may enable the first image 1110 displayed on the front display panel 31 to be displayed on the back display panel 33 in response to selection of the accept button 2610 as shown in FIG. 28. The back display panel 33 may change the second image 1130 to the first image 1110.

Meanwhile, when the accept button 2610 is selected, the controller of the double-sided display device may display a message 2810 indicating that the screen of the front display panel 31 will be duplicated through the back display panel 33.

In another embodiment, when the front mirroring item 2253 is selected, the controller of the double-sided display device may duplicate the first image displayed on the front display panel 31 to the back display panel 33 without displaying the inquiry window 2600, as shown in FIG. 28.

When an image, to which HDCP (High-band Digital Content Protection) technology is applied, is mirrored (or duplicated), as shown in FIG. 29, the controller of the double-sided display device may display a popup window 2900 indicating that the encrypted content cannot be mirrored at the time of being reproduced through the front display panel 31. The HDCP technology refers to technology of encrypting the transmission and reception path of a digital signal of content to prevent the content from being illegally copied. That is, the controller of the double-sided display device may display the popup window shown in FIG. 29 if HDCP technology is applied when the first image displayed on the front display panel 31 is duplicated to the back display panel 33.

Meanwhile, when a command for finishing the screen mirroring function is received through the mirroring button (not shown) provided in the remote control device 50 while the screen mirroring function is performed, the controller of the double-sided display device may display a popup window 300 indicating that the screen mirroring mode is finished, as shown in FIG. 30.

Figure 31:
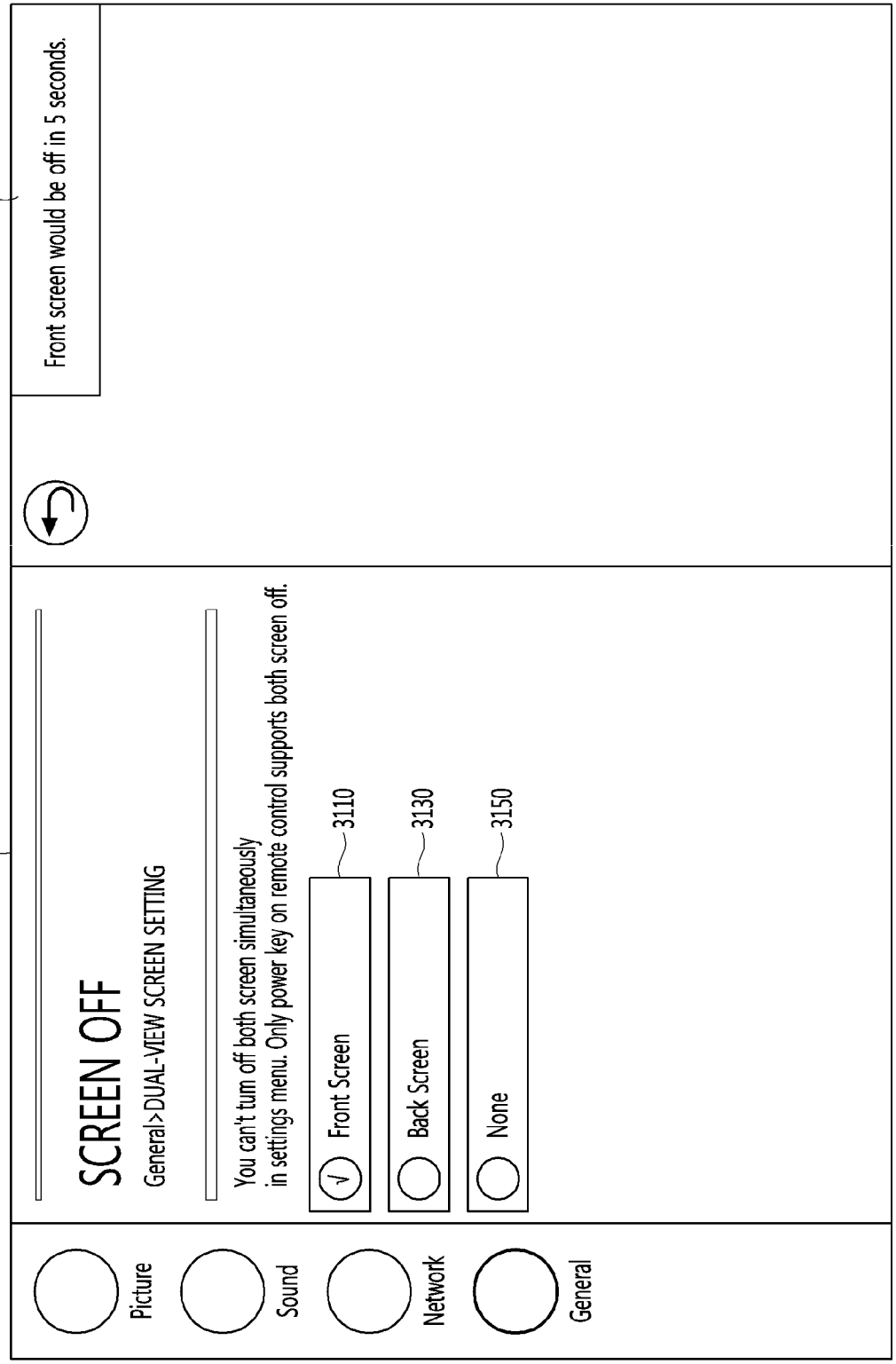
FIGS. 31 and 33 are diagrams a process of controlling a double-sided display panel through a screen off item according to an embodiment of the present invention.
Figure 33:

FIGS. 31 and 33 are diagrams a process of controlling a double-sided display panel through a screen off item according to an embodiment of the present invention.

When the screen off item 2250 included in the double-sided display setting screen 2200 is selected, the controller may display the screen off setting screen 3100, as shown in FIG. 31.

The screen off setting screen 3100 may be an item for controlling the power state of one or more of the front display panel 31 and the back display panel 33. The screen off setting screen 3100 may include a front screen off item 3110, a back screen off screen 3130 and a non-selection item 3150.

The front screen off item 3110 may be an item for turning the front display panel 31 off. When the front screen off item 3110 is selected, as shown in FIG. 31, the controller may display a popup window 3170 indicating that the screen of the front display panel 31 is turned off after 5 seconds. However, 5 seconds are merely exemplary.

The back screen off item 3130 may be an item for turning the back display panel 33 off.

The non-selection item 3150 may be an item for disabling screen off setting of the front display panel 31 and the back display panel 33.

In one embodiment, the user may manipulate the power button (not shown) provided in the remote control device 50 to simultaneously turn the front display panel 31 and the back display panel 33 on or off. That is, when a double-side off command is received from the remote control device, the double-sided display device may turn the screens of the front display panel 31 and the back display panel 33 off. When a button other than the power button provided in the remote control device 50 is pressed, the screen of the front display panel 31 may be turned on. As another example, when reserved playback is set, the screen of the front display panel 31 may be automatically turned on at a reserved time. The back display panel 33 may be turned off through the back screen off item 3130. When reserved playback is set, the screen of the back display panel 33 may be automatically turned on at a reserved time.

Meanwhile, the double-sided display panel 30 may be turned on or off at a specific time through setting.

Figure 32:

FIG. 32 shows an example of setting an on/off time of a display panel when the double-sided display device is connected to a network according to an embodiment of the present invention, and FIG. 33 shows a screen for setting a current time when the double-sided display device is not connected to the network.

Here, the network may be a communication network such as the Internet or Ethernet, without being limited thereto.

When the front screen off item 3110 included in the screen off setting screen shown in FIG. 31 is selected and the double-sided display device is connected to the network, the controller may display a detailed time setting screen, as shown in FIG. 32. The detailed time setting screen 3200 may include a screen on time setting item 3210 for setting a time when the screen of the front display panel 31 is turned on, a screen off setting item 3230 for setting a time when the screen of the front display panel 31 is turned off, and an input source item 3250 for providing information on an input source for providing an image to the front display panel 31.

The user may set a time when the screen of the front display panel 31 is turned on through the screen on time setting item 3210 and set a time when the screen of the front display panel 31 is turned off through the screen off time setting item 3230.

In addition, the user may set an input source, which will provide an image, through the input source item 3250. The user may set each item through the screen off setting screen 3100 and then press a Done button 3270, thereby finishing screen off setting.

When the front screen off item 3110 included in the screen off setting screen 3100 shown in FIG. 31 is selected and the double-sided display device is not connected to the network, as shown in FIG. 33, the controller may display a current time setting screen 3300. The current time setting screen 3300 may include a current time setting popup window 3310 for setting a current time and a current date. That is, when the double-sided display device is not connected to the network, the screen on time setting item 3210, the screen off time setting item 3230 and the input source item 3250 described with reference to FIG. 32 may be deactivated and the current time setting popup window 33110 may be displayed.

The invention can also be embodied as processor-readable codes on a processor-readable medium having a program recorded thereon. Examples of the processor-readable medium include read-only memories (ROMs), random-access memories (RAMs), CD-ROMs, magnetic tapes, floppy disks, optical data storage devices, and carrier waves (such as data transmission through the Internet).

The above-described display device is not limited to the configurations and methods of the above-described embodiments and some or all of the embodiments may be selectively combined such that various modifications are made.

What is claimed is:

1. An output device for controlling operation of a double-sided display panel, the output device comprising:
   a double-sided display comprising a front display panel and a back display panel; and
   a main output device comprising:
   a master controller configured to control operation of the front display panel;
   a slave controller configured to control operation of the back display panel;
   a first multiplexer controlled by the master controller and configured to receive a first image input to the master controller and a second image input to the slave controller; and
   a second multiplexer controlled by the slave controller and configured to receive the first image and the second image,
   wherein the master controller is further configured to control the first multiplexer and the second multiplexer such that any one of the first image or the second image is output on each of the front display panel and the back display panel based on an image output control command, and
   a bridge output device that is separate from the main output device, wherein the bridge output device comprises:
   a first bridge board configured to output any one of the first image or the second image received from the first multiplexer to the front display panel,
   a second bridge board configured to output any one of the first image or the second image received from the second multiplexer to the back display panel, and
   an infrared (IR) reception unit configured to receive the image output control command from a remote control device and transmit the image output control command to the master controller, wherein the image output control command is at least one of an individual image output control command, a swap image output control command, a master duplication image output control command, or a slave duplication image output control command,
   wherein the master controller is further configured to:
   cause the front display panel to display a popup window indicating that an encrypted content cannot be duplicated at a time of reproduction based at least in part on the first image corresponding to the encrypted content and the master duplication image output control command being received from the remote control device,
   cause a display of a double-sided display setting screen on one of the front display panel or the back display panel based on receiving an IR signal from the remote control device,
   wherein the double-sided display setting screen comprises: a clone item for applying setting elements to another of the front display panel or the back display panel that does not display the double-sided display setting screen without change, a front display name item for setting a name of the front display panel, a back display name item for setting a name of the back display panel, and a screen swap item for swapping the first image displayed on the front display panel with a second image displayed on the back display panel,
   cause a display of a screen off setting screen on one of the front display panel or the back display panel based on receiving an IR signal from the remote control device, wherein the screen off setting screen comprises an item for controlling a power of state of the front display panel or the back display panel,
   cause only one of the front display panel or the back display panel to turn off based on receiving an input corresponding to a selection of turning off the front display panel or the back display panel from the displayed screen off item,
   set the name of the front display panel based on receiving an input corresponding to a selection of the front display name item,
   set the name of the back display panel based on receiving an input corresponding to a selection of the back display name item, and
   cause the first image displayed on the front display panel to switch with the second image displayed on the back display panel based on receiving an input corresponding to a selection of the screen swap item.

2. The output device according to claim 1, wherein the master controller is further configured to transmit, to the first multiplexer, a low signal for enabling the first multiplexer to output the first image or a high signal for enabling the first multiplexer to output the second image, based on the image output control command, and
   wherein the slave controller is further configured to transmit, to the second multiplexer, a low signal for enabling the second multiplexer to output the second image or a high signal for enabling the second multiplexer to outputting the first image.

3. The output device according to claim 2, wherein, based on the image output control command being the individual image output control command, the master controller is further configured to transmit, to the first multiplexer, the low signal for enabling the first multiplexer to output the first image, and the slave controller is further configured to transmit, to the second multiplexer, the low signal for enabling the second multiplexer to output the second image.

4. The output device according to claim 2, wherein, based on the image output control command being the swap image output control command, the master controller is further configured to transmit, to the first multiplexer, the high signal for enabling the first multiplexer to output the second image, and the slave controller is further configured to transmit, to the second multiplexer, the high signal for enabling the second multiplexer to output the first image.

5. The output device according to claim 2, wherein, based on the image output control command being the master duplication image output control command, the master controller is further configured to transmit, to the first multiplexer, the low signal for enabling the first multiplexer to output the first image, and the slave controller is further configured to transmit, to the second multiplexer, the high signal for enabling the second multiplexer to output the first image.

6. The output device according to claim 2, wherein, based on the image output control command being the slave duplication image output control command, the master controller is further configured to transmit, to the first multiplexer, the high signal for enabling the first multiplexer to output the second image, and the slave controller is further configured to transmit, to the second multiplexer, the low signal for enabling the second multiplexer to output the second image.

7. The output device according to claim 2, wherein each of the first multiplexer and the second multiplexer includes an image selection pin for outputting only any one of the first image and the second image, and wherein the low signal or the high signal is input to the image selection pin.

8. The output device according to claim 7, wherein each of the first multiplexer and the second multiplexer further includes a plurality of pins for receiving the first image and a plurality of pins for receiving the second image, and wherein any one of the first image and the second image is output based on a signal input to the image selection pin.

9. The output device according to claim 1, further comprising:
a first distributer configured to distribute the first image to the first multiplexer and the second multiplexer; and
a second distributor configured to distribute the second image to the first multiplexer and the second multiplexer.

10. The output device according to claim 1, wherein, based on the IR reception unit receiving a request for controlling the power state of the double-sided display panel, the master controller is further configured to control the power state of both the front display panel and the back display panel on the double-sided display panel according to a power control command based on the request.

11. The output device according to claim 1, wherein each of the first multiplexer and the second multiplexer includes a high definition multimedia interface (HDMI) port for outputting any one of the first image and the second image.

12. The output device according to claim 1, wherein the master controller is further configured to deliver the image output control command to the slave controller, and wherein the slave controller is further configured to control the second multiplexer such that any one of the first image and the second image is output on the back display panel based on the image output control command.

13. The output device according to claim 1, wherein the double-sided display setting screen further comprises:
a screen mirroring item for setting the first image displayed on the front display to be displayed on the back panel or setting the second image displayed on the back display to be displayed on the front panel, and wherein the master controller is further configured to:
cause the first image displayed on the front display to be displayed on the back panel or cause the second image displayed on the back display to be displayed on the front panel based on receiving an input corresponding to a selection of the screen mirroring item.

\* \* \* \* \*